United States Patent
Spink et al.

(10) Patent No.: US 9,293,778 B2
(45) Date of Patent: Mar. 22, 2016

(54) PROTON EXCHANGE MEMBRANE FUEL CELL

(75) Inventors: Scott A. Spink, Spokane, WA (US);
David R. Lott, Spokane, WA (US);
Matthew M. Wright, Spokane, WA (US); Dinesh S. Yemul, Liberty Lake, WA (US); William A. Fuglevand, Spokane, WA (US); Shiblihanna I. Bayuuk, Spokane, WA (US); Runrun Duan, Liberty Lake, WA (US); Lijun Bai, Spokane, WA (US)

(73) Assignee: Emergent Power Inc., Latham, NY (US)

( * ) Notice: Subject to any disclaimer, the term of this patent is extended or adjusted under 35 U.S.C. 154(b) by 977 days.

(21) Appl. No.: 11/811,624

(22) Filed: Jun. 11, 2007

(65) Prior Publication Data

US 2008/0305378 A1    Dec. 11, 2008

(51) Int. Cl.
*H01M 8/10* (2006.01)
*H01M 4/88* (2006.01)
*H01M 8/02* (2006.01)

(52) U.S. Cl.
CPC .......... *H01M 8/1004* (2013.01); *H01M 4/8807* (2013.01); *H01M 8/0236* (2013.01); *H01M 8/0245* (2013.01); *Y02E 60/521* (2013.01)

(58) Field of Classification Search
None
See application file for complete search history.

(56) References Cited

U.S. PATENT DOCUMENTS

| | | | |
|---|---|---|---|
| 3,061,658 A | 10/1962 | Blackmer | |
| 3,134,697 A | 5/1964 | Niedrach | |
| 3,297,487 A | 10/1964 | Pomeroy et al. | |
| 3,183,123 A | 5/1965 | Haworth | |
| 3,346,421 A | 10/1967 | Thompson et al. | |
| 3,380,856 A | 4/1968 | Pohl | |
| 3,494,174 A | 2/1970 | Green et al. | |
| 3,645,796 A | 2/1972 | Bohm et al. | |
| 3,668,905 A | 6/1972 | Schlunke | |
| 3,756,579 A | 9/1973 | Remick | |
| 4,017,426 A | 4/1977 | Carbonnel et al. | |
| 4,076,899 A | 2/1978 | Kring | |
| 4,192,906 A | 3/1980 | Maru | |
| 4,252,868 A | 2/1981 | Bohm et al. | |
| 4,276,355 A | 6/1981 | Kothmann et al. | |
| 4,310,605 A | 1/1982 | Early et al. | |
| 4,324,636 A | 4/1982 | Dankese | |

(Continued)

FOREIGN PATENT DOCUMENTS

| CN | 1108005 A | 9/1995 |
|---|---|---|
| DE | 19805683 | 8/1999 |

(Continued)

OTHER PUBLICATIONS

U.S. Appl. No. 11/284,173, filed Nov. 21, 2005, Fuglevand et al.

(Continued)

*Primary Examiner* — Alix Eggerding
(74) *Attorney, Agent, or Firm* — Rainier Patents P.S.; Paul W. Mitchell; Remembrance Newcombe

(57) ABSTRACT

A proton exchange membrane fuel cell is described and which includes a proton exchange membrane having at least one gas diffusion layer which is juxtaposed relative thereto, and which is fabricated, at least in part, of a porous, electrically conductive, inorganic material which is selected from the group comprising metal diborides, metal disilicides, metal nitrides, metal carbides, and composites, laminates and solid solutions thereof.

16 Claims, 6 Drawing Sheets

(56) References Cited

U.S. PATENT DOCUMENTS

| | | |
|---|---|---|
| 4,324,844 A | 4/1982 | Kothman |
| 4,444,851 A | 4/1984 | Maru |
| 4,508,793 A | 4/1985 | Kumata et al. |
| H16 H | 1/1986 | Kaun |
| 4,590,134 A | 5/1986 | Warszawski et al. |
| 4,590,135 A | 5/1986 | Warszawski et al. |
| 4,599,282 A | 7/1986 | Hirota et al. |
| 4,604,332 A | 8/1986 | Warszawski et al. |
| 4,640,873 A | 2/1987 | Tajima et al. |
| 4,640,876 A | 2/1987 | Warzawski et al. |
| 4,642,274 A | 2/1987 | Tsutsumi et al. |
| 4,647,359 A | 3/1987 | Lindstrom |
| 4,648,955 A | 3/1987 | Maget |
| 4,661,411 A | 4/1987 | Martin et al. |
| 4,670,702 A | 6/1987 | Yamada et al. |
| 4,686,158 A | 8/1987 | Nishi et al. |
| 4,719,157 A | 1/1988 | Tsutsumi et al. |
| 4,722,873 A | 2/1988 | Matsumura |
| 4,727,191 A | 2/1988 | Nalepa |
| 4,728,585 A | 3/1988 | Briggs |
| 4,746,363 A | 5/1988 | DeAngelis |
| 4,769,297 A | 9/1988 | Reiser et al. |
| 4,795,536 A | 1/1989 | Young et al. |
| 4,797,185 A | 1/1989 | Polak et al. |
| 4,797,190 A | 1/1989 | Peck |
| 4,804,592 A | 2/1989 | Vanderborgh et al. |
| 4,818,637 A | 4/1989 | Molter et al. |
| 4,826,741 A | 5/1989 | Aldhart et al. |
| 4,826,742 A | 5/1989 | Reiser |
| 4,849,253 A | 7/1989 | Maricle et al. |
| 4,849,308 A | 7/1989 | Schmitten et al. |
| 4,863,813 A | 9/1989 | Dyer |
| 4,873,155 A | 10/1989 | Hirota et al. |
| 4,876,115 A | 10/1989 | Raistrick |
| 4,894,355 A | 1/1990 | Takeuchi et al. |
| 4,927,793 A | 5/1990 | Hori et al. |
| 4,973,530 A | 11/1990 | Vanderborgh et al. |
| 4,973,531 A | 11/1990 | Zaima et al. |
| 4,982,309 A | 1/1991 | Shepherd |
| 4,983,472 A | 1/1991 | Katz et al. |
| 4,994,331 A | 2/1991 | Cohen |
| 4,997,728 A | 3/1991 | Onoda et al. |
| 5,009,968 A | 4/1991 | Guthrie et al. |
| 5,049,459 A | 9/1991 | Akagi |
| 5,053,294 A | 10/1991 | Sernka et al. |
| 5,069,985 A | 12/1991 | Cohen et al. |
| 5,084,144 A | 1/1992 | Reddy |
| 5,085,950 A | 2/1992 | Primdahl |
| 5,094,928 A | 3/1992 | Dyer |
| 5,117,482 A | 5/1992 | Hauber |
| 5,132,193 A | 7/1992 | Reddy et al. |
| 5,164,060 A | 11/1992 | Eisman et al. |
| 5,185,220 A | 2/1993 | Schora |
| 5,187,025 A | 2/1993 | Kelland et al. |
| 5,190,834 A | 3/1993 | Kendall |
| 5,192,627 A | 3/1993 | Perry, Jr. et al. |
| 5,200,278 A | 4/1993 | Watkins et al. |
| 5,219,673 A | 6/1993 | Kaun |
| 5,232,792 A | 8/1993 | Reznikov |
| 5,234,777 A | 8/1993 | Wilson |
| 5,242,764 A | 9/1993 | Dhar |
| 5,246,792 A | 9/1993 | Watanabe |
| 5,248,566 A | 9/1993 | Kumar et al. |
| 5,252,410 A | 10/1993 | Wilkinson et al. |
| 5,262,249 A | 11/1993 | Beal et al. |
| 5,264,299 A | 11/1993 | Krasij et al. |
| 5,266,421 A | 11/1993 | Townsend et al. |
| 5,270,131 A | 12/1993 | Diethelm et al. |
| 5,272,017 A | 12/1993 | Swathirajan et al. |
| 5,273,837 A | 12/1993 | Aitken et al. |
| 5,286,568 A | 2/1994 | Bacino et al. |
| 5,286,579 A | 2/1994 | Akagi |
| 5,292,600 A | 3/1994 | Kaufman |
| 5,302,269 A | 4/1994 | Eisman et al. |
| 5,304,430 A | 4/1994 | Ludwig |
| 5,316,869 A | 5/1994 | Perry, Jr. et al. |
| 5,316,871 A | 5/1994 | Swathirajan et al. |
| 5,330,860 A | 7/1994 | Grot et al. |
| 5,336,570 A | 8/1994 | Dodge, Jr. |
| 5,338,622 A | 8/1994 | Hsu et al. |
| 5,344,721 A | 9/1994 | Sonai et al. |
| 5,346,780 A | 9/1994 | Suzuki |
| 5,350,643 A | 9/1994 | Imahashi et al. |
| 5,358,620 A | 10/1994 | Golovin et al. |
| 5,358,799 A | 10/1994 | Gardner |
| 5,364,711 A | 11/1994 | Yamada et al. |
| 5,366,818 A | 11/1994 | Wilkinson et al. |
| 5,372,896 A | 12/1994 | Binder et al. |
| 5,378,247 A | 1/1995 | Sasaki et al. |
| 5,382,478 A | 1/1995 | Chow et al. |
| 5,395,705 A | 3/1995 | Door et al. |
| 5,403,675 A | 4/1995 | Ogata et al. |
| 5,413,878 A | 5/1995 | Williams et al. |
| 5,419,980 A | 5/1995 | Okamoto et al. |
| 5,432,020 A | 7/1995 | Fleck |
| 5,436,086 A | 7/1995 | Seymour et al. |
| 5,449,697 A | 9/1995 | Noaki et al. |
| 5,462,815 A | 10/1995 | Horiuchi |
| 5,470,671 A | 11/1995 | Fletcher et al. |
| 5,470,672 A | 11/1995 | Naoumidis |
| 5,482,792 A | 1/1996 | Faita et al. |
| 5,484,666 A | 1/1996 | Gibb et al. |
| 5,486,430 A | 1/1996 | Gorbell et al. |
| 5,500,292 A | 3/1996 | Muranaka et al. |
| 5,503,945 A | 4/1996 | Petri et al. |
| 5,514,487 A | 5/1996 | Washington et al. |
| 5,523,175 A | 6/1996 | Beal et al. |
| 5,525,436 A | 6/1996 | Savinell et al. |
| 5,532,072 A | 7/1996 | Spaeh et al. |
| 5,534,362 A | 7/1996 | Okamoto et al. |
| 5,543,238 A | 8/1996 | Strasser |
| 5,543,239 A | 8/1996 | Virkar et al. |
| 5,543,240 A | 8/1996 | Lee et al. |
| 5,547,776 A | 8/1996 | Fletcher et al. |
| 5,547,777 A | 8/1996 | Richards |
| 5,561,202 A | 10/1996 | Helmer-Metzmann et al. |
| 5,565,072 A | 10/1996 | Faita et al. |
| 5,578,388 A | 11/1996 | Faita et al. |
| 5,607,785 A | 3/1997 | Tozawa et al. |
| 5,624,769 A | 4/1997 | Li et al. |
| 5,629,104 A | 5/1997 | Crawford, Sr. et al. |
| 5,635,039 A | 6/1997 | Cisar et al. |
| 5,639,516 A | 6/1997 | Dirven et al. |
| 5,654,109 A | 8/1997 | Plowman et al. |
| 5,686,200 A | 11/1997 | Barton et al. |
| 5,707,755 A | 1/1998 | Grot |
| 5,733,678 A | 3/1998 | Ledjeff et al. |
| 5,736,269 A | 4/1998 | Okamoto et al. |
| 5,747,185 A | 5/1998 | Hsu |
| 5,750,281 A | 5/1998 | Washington et al. |
| 5,773,161 A | 6/1998 | Farooque et al. |
| 5,776,625 A | 7/1998 | Kaufman et al. |
| 5,789,091 A | 8/1998 | Wozniczka et al. |
| 5,789,094 A | 8/1998 | Kusunoki et al. |
| 5,795,671 A | 8/1998 | Nirasawa et al. |
| 5,798,187 A | 8/1998 | Wilson et al. |
| 5,804,328 A | 9/1998 | Odegard et al. |
| 5,827,602 A | 10/1998 | Koch et al. |
| 5,863,671 A | 1/1999 | Spear, Jr. et al. |
| 5,879,826 A | 3/1999 | Lehman et al. |
| 5,916,701 A | 6/1999 | Carter et al. |
| 5,925,039 A | 7/1999 | Landingham |
| 5,964,991 A | 10/1999 | Kawasaki et al. |
| 5,972,530 A | 10/1999 | Shelekhin et al. |
| 5,989,741 A | 11/1999 | Bloomfield et al. |
| 5,993,987 A | 11/1999 | Wozniczka et al. |
| 5,998,057 A | 12/1999 | Koschany et al. |
| 6,001,502 A | 12/1999 | Walsh |
| 6,010,798 A | 1/2000 | Hammerschmidt et al. |
| 6,022,634 A | 2/2000 | Ramunni et al. |
| 6,024,848 A | 2/2000 | Dufner et al. |
| 6,025,457 A | 2/2000 | Ohno et al. |
| 6,030,718 A | 2/2000 | Fuglevand et al. |
| 6,037,072 A | 3/2000 | Wislon et al. |

(56) References Cited

U.S. PATENT DOCUMENTS

| | | |
|---|---|---|
| 6,037,073 A | 3/2000 | Besmann et al. |
| 6,040,072 A | 3/2000 | Murphy et al. |
| 6,040,076 A | 3/2000 | Reeder |
| 6,042,955 A | 3/2000 | Okamoto |
| 6,042,959 A | 3/2000 | Debe et al. |
| 6,051,331 A | 4/2000 | Spear, Jr. et al. |
| 6,051,343 A | 4/2000 | Suzuki et al. |
| 6,054,228 A | 4/2000 | Cisar et al. |
| 6,054,230 A | 4/2000 | Kato |
| 6,066,409 A | 5/2000 | Ronne et al. |
| 6,077,620 A | 6/2000 | Pettit |
| 6,080,290 A | 6/2000 | Stuart et al. |
| 6,083,638 A | 7/2000 | Taniguchi et al. |
| 6,087,028 A | 7/2000 | Goto |
| 6,096,449 A | 8/2000 | Fuglevand et al. |
| 6,106,963 A | 8/2000 | Nitta et al. |
| 6,106,964 A | 8/2000 | Voss et al. |
| 6,110,612 A | 8/2000 | Walsh |
| 6,117,287 A | 9/2000 | Molter et al. |
| 6,117,577 A | 9/2000 | Wilson |
| 6,124,051 A | 9/2000 | Johnson |
| 6,132,895 A | 10/2000 | Pratt et al. |
| 6,143,675 A | 11/2000 | McCollam et al. |
| 6,146,780 A | 11/2000 | Cisar et al. |
| 6,146,781 A | 11/2000 | Surampudi et al. |
| 6,159,626 A | 12/2000 | Keskula et al. |
| 6,171,374 B1 | 1/2001 | Barton et al. |
| 6,171,720 B1 | 1/2001 | Besmann et al. |
| 6,174,616 B1 | 1/2001 | Marvin et al. |
| 6,180,274 B1 | 1/2001 | Yoshimoto et al. |
| 6,180,275 B1 | 1/2001 | Braun et al. |
| 6,183,896 B1 | 2/2001 | Horita et al. |
| 6,183,898 B1 | 2/2001 | Koschany et al. |
| 6,194,095 B1 | 2/2001 | Hockaday |
| 6,194,099 B1 | 2/2001 | Gernov et al. |
| 6,200,698 B1 | 3/2001 | Carlstrom, Jr. |
| 6,207,310 B1 | 3/2001 | Wilson et al. |
| 6,207,312 B1 | 3/2001 | Wynne et al. |
| 6,214,487 B1 | 4/2001 | Kelley et al. |
| 6,218,035 B1 | 4/2001 | Fuglevand et al. |
| 6,218,039 B1 | 4/2001 | Mease et al. |
| 6,232,008 B1 | 5/2001 | Wozniczka et al. |
| 6,235,168 B1 | 5/2001 | Strutt et al. |
| 6,248,466 B1 | 6/2001 | Takahashi et al. |
| 6,248,469 B1 | 6/2001 | Formato et al. |
| RE37,284 E | 7/2001 | Li et al. |
| 6,255,012 B1 | 7/2001 | Wilson et al. |
| 6,280,870 B1 | 8/2001 | Eisman et al. |
| 6,280,883 B1 | 8/2001 | Lamanna et al. |
| 6,287,717 B1 | 9/2001 | Cavalca et al. |
| 6,291,094 B1 | 9/2001 | Yoshimura et al. |
| 6,297,185 B1 | 10/2001 | Thompson et al. |
| 6,322,914 B1 | 11/2001 | Chow et al. |
| 6,322,919 B1 | 11/2001 | Yang et al. |
| 6,329,093 B1 | 12/2001 | Ohara et al. |
| 6,329,094 B1 | 12/2001 | Yasuo et al. |
| 6,350,539 B1 | 2/2002 | Wood, III et al. |
| 6,358,641 B1 | 3/2002 | Mease |
| 6,365,293 B1 | 4/2002 | Isono et al. |
| 6,372,376 B1 | 4/2002 | Fronk et al. |
| 6,383,677 B1 | 5/2002 | Allen |
| 6,387,556 B1 | 5/2002 | Fuglevand et al. |
| 6,403,245 B1 | 6/2002 | Hunt |
| 6,406,806 B1 | 6/2002 | Keskula et al. |
| 6,410,180 B1 | 6/2002 | Cisar et al. |
| 6,416,895 B1 | 7/2002 | Voss et al. |
| 6,423,437 B1 | 7/2002 | Kenyon et al. |
| 6,425,993 B1 | 7/2002 | Debe et al. |
| 6,428,921 B1 | 8/2002 | Grot |
| 6,444,346 B1 | 9/2002 | Ohara et al. |
| 6,451,469 B1 | 9/2002 | Nakamura et al. |
| 6,451,471 B1 | 9/2002 | Braun |
| 6,468,682 B1 | 10/2002 | Fuglevand et al. |
| 6,485,854 B1 | 11/2002 | Grover et al. |
| 6,492,047 B1 | 12/2002 | Peled et al. |
| 6,497,975 B2 | 12/2002 | Bostaph et al. |
| 6,503,654 B2 | 1/2003 | Marchetti |
| 6,506,511 B1 | 1/2003 | Lakeman et al. |
| 6,524,452 B1 | 2/2003 | Clark et al. |
| 6,531,238 B1 | 3/2003 | King |
| 6,531,241 B1 | 3/2003 | McEwen |
| 6,544,679 B1 | 4/2003 | Petillo et al. |
| 6,566,004 B1 | 5/2003 | Fly et al. |
| 6,602,631 B1 | 8/2003 | Cisar et al. |
| 6,605,381 B1 | 8/2003 | Rosenmayer |
| 6,613,468 B2 | 9/2003 | Simpkins et al. |
| 6,630,261 B2 | 10/2003 | Buchner et al. |
| 6,635,378 B1 | 10/2003 | Yang et al. |
| 6,638,655 B2 | 10/2003 | Gyoten et al. |
| 6,638,657 B1 | 10/2003 | Cisar et al. |
| 6,649,031 B1 | 11/2003 | Iqbal et al. |
| 6,653,009 B2 | 11/2003 | Wang et al. |
| 6,656,624 B1 | 12/2003 | King |
| 6,660,419 B1 | 12/2003 | Nishida et al. |
| 6,663,992 B2 | 12/2003 | Lehnert et al. |
| 6,686,080 B2 | 2/2004 | Farkash et al. |
| 6,692,851 B2 | 2/2004 | Keskula et al. |
| 6,703,155 B2 | 3/2004 | Scartozzi |
| 6,716,549 B2 | 4/2004 | Bai et al. |
| 6,720,101 B1 | 4/2004 | Dong et al. |
| 6,720,105 B2 | 4/2004 | Ohlsen et al. |
| 6,733,913 B2 | 5/2004 | Cisar et al. |
| 6,740,443 B2 | 5/2004 | Yamazaki et al. |
| 6,749,959 B2 | 6/2004 | Nakata et al. |
| 6,761,990 B1 | 7/2004 | Yoshitake et al. |
| 6,764,786 B2 | 7/2004 | Morrow et al. |
| 6,770,394 B2 | 8/2004 | Appleby et al. |
| 6,779,351 B2 | 8/2004 | Maisotsenko et al. |
| 6,783,878 B2 | 8/2004 | Voss et al. |
| 6,794,068 B2 | 9/2004 | Rapaport et al. |
| 6,805,990 B2 | 10/2004 | Gorbell |
| 6,808,832 B2 | 10/2004 | Suzuki et al. |
| 6,828,057 B2 | 12/2004 | Ovshinsky et al. |
| 6,828,062 B2 | 12/2004 | Lu et al. |
| 6,838,202 B2 | 1/2005 | Brady et al. |
| 6,838,205 B2 | 1/2005 | Cisar et al. |
| 6,844,101 B2 | 1/2005 | Lee et al. |
| 6,847,188 B2 | 1/2005 | Keskula et al. |
| 6,852,437 B2 | 2/2005 | Cisar et al. |
| 6,855,450 B2 | 2/2005 | Molter et al. |
| 6,863,838 B2 | 3/2005 | Hamrock |
| 6,869,720 B2 | 3/2005 | Anderson et al. |
| 6,872,487 B2 | 3/2005 | Karichev |
| 6,887,610 B2 | 5/2005 | Elhamid et al. |
| 6,890,680 B2 | 5/2005 | Beckamann et al. |
| 6,913,848 B2 | 7/2005 | Walsh |
| 6,916,572 B2 | 7/2005 | Lundsgaard et al. |
| 6,926,981 B2 | 8/2005 | Voss |
| 6,939,636 B2 | 9/2005 | Fuglevand et al. |
| 6,942,941 B2 | 9/2005 | Blunk et al. |
| 6,951,698 B2 | 10/2005 | King |
| 6,955,862 B2 | 10/2005 | Hartnack et al. |
| 6,960,404 B2 | 11/2005 | Goebel |
| 6,972,162 B2 | 12/2005 | Gao et al. |
| 6,974,648 B2 | 12/2005 | Goebel |
| 6,986,959 B2 | 1/2006 | Clark et al. |
| 6,989,216 B2 | 1/2006 | Puttaiah et al. |
| 7,001,687 B1 | 2/2006 | Gaines et al. |
| 7,005,209 B1 | 2/2006 | Gaines et al. |
| 7,014,947 B2 | 3/2006 | Speranza et al. |
| 7,018,732 B2 | 3/2006 | Cargnelli et al. |
| 7,045,229 B2 | 5/2006 | Kobayashi et al. |
| 7,067,209 B2 | 6/2006 | Breault |
| 7,067,214 B2 | 6/2006 | Dave et al. |
| 7,070,874 B2 | 7/2006 | Blanchet et al. |
| 7,071,121 B2 | 7/2006 | Punsalan et al. |
| 7,078,117 B2 | 7/2006 | Mossman |
| 7,087,327 B2 | 8/2006 | Pearson |
| 7,157,177 B2 | 1/2007 | Chan |
| 7,160,642 B2 | 1/2007 | Tarver et al. |
| 7,195,836 B2 | 3/2007 | Lisi et al. |
| 7,205,057 B2 | 4/2007 | McLean |
| 7,205,062 B2 | 4/2007 | Tawlik et al. |
| 7,214,442 B2 | 5/2007 | Ramsey et al. |

(56) References Cited

U.S. PATENT DOCUMENTS

| | | | |
|---|---|---|---|
| 7,247,398 | B2 | 7/2007 | Logan et al. |
| 7,270,906 | B2 | 9/2007 | Haltiner, Jr. et al. |
| 7,294,425 | B2 | 11/2007 | Hodge et al. |
| 7,297,428 | B2 | 11/2007 | Saulsbury et al. |
| 7,309,535 | B2 | 12/2007 | Ovshinsky et al. |
| 7,309,539 | B2 | 12/2007 | Kato et al. |
| 7,833,645 | B2 | 11/2010 | Fuglevand et al. |
| 8,192,889 | B2 | 6/2012 | Spink et al. |
| 2002/0045085 | A1 | 4/2002 | Formato et al. |
| 2002/0110726 | A1 | 8/2002 | Busse et al. |
| 2002/0127452 | A1 | 9/2002 | Wilkinson et al. |
| 2002/0177039 | A1 | 11/2002 | Lu et al. |
| 2003/0013002 | A1 | 1/2003 | Jankowski et al. |
| 2003/0035991 | A1 | 2/2003 | Colombo et al. |
| 2003/0082431 | A1 | 5/2003 | Klitsner et al. |
| 2003/0082434 | A1 | 5/2003 | Wang et al. |
| 2003/0087151 | A1 | 5/2003 | Hamrock |
| 2003/0134178 | A1 | 7/2003 | Larson |
| 2003/0170521 | A1 | 9/2003 | Zhang |
| 2003/0180603 | A1 | 9/2003 | Richards |
| 2003/0198861 | A1* | 10/2003 | Bai et al. ............... 429/44 |
| 2004/0033414 | A1 | 2/2004 | Rohrl |
| 2004/0038105 | A1 | 2/2004 | Hennige et al. |
| 2004/0043271 | A1 | 3/2004 | Wilkinson et al. |
| 2004/0043279 | A1 | 3/2004 | Rapaport et al. |
| 2004/0050713 | A1 | 3/2004 | Chuang et al. |
| 2004/0054041 | A1 | 3/2004 | Schmidt |
| 2004/0077519 | A1 | 4/2004 | Price et al. |
| 2004/0086775 | A1 | 5/2004 | Lloyd et al. |
| 2004/0191617 | A1 | 9/2004 | Visco et al. |
| 2004/0197608 | A1 | 10/2004 | Fuglevand |
| 2004/0214057 | A1 | 10/2004 | Fuglevand et al. |
| 2005/0008912 | A1 | 1/2005 | Yang et al. |
| 2005/0031925 | A1 | 2/2005 | Ofer et al. |
| 2005/0069780 | A1 | 3/2005 | Kinouchi et al. |
| 2005/0079403 | A1 | 4/2005 | Lipka et al. |
| 2005/0084741 | A1 | 4/2005 | Leddy et al. |
| 2005/0089733 | A1 | 4/2005 | Punsalan et al. |
| 2005/0100662 | A1 | 5/2005 | Ohba et al. |
| 2005/0103706 | A1 | 5/2005 | Bennett et al. |
| 2005/0106440 | A1 | 5/2005 | Komiya |
| 2005/0118185 | A1 | 6/2005 | Hombach et al. |
| 2005/0143517 | A1 | 6/2005 | Schmidt |
| 2006/0014068 | A1 | 1/2006 | Boysen et al. |
| 2006/0083962 | A1* | 4/2006 | Takekawa et al. ............... 429/13 |
| 2006/0134498 | A1 | 6/2006 | Hamm et al. |
| 2006/0199061 | A1* | 9/2006 | Fiebig et al. ............... 429/32 |
| 2006/0269821 | A1* | 11/2006 | Nakagawa et al. ............... 429/38 |
| 2007/0042252 | A1* | 2/2007 | Kazarinov ............... 429/34 |
| 2007/0117005 | A1 | 5/2007 | Fuglevand et al. |
| 2008/0138684 | A1 | 6/2008 | Lewinski et al. |
| 2008/0171255 | A1 | 7/2008 | Brantley et al. |
| 2009/0075149 | A1 | 3/2009 | Haile et al. |
| 2009/0169939 | A1 | 7/2009 | Devries |
| 2012/0214078 | A1 | 8/2012 | Spink |

FOREIGN PATENT DOCUMENTS

| | | |
|---|---|---|
| EP | 1498971 | 1/2005 |
| EP | 1575114 | 9/2005 |
| JP | 7114931 | 5/1995 |
| WO | PCT/US2006/39529 | 10/2006 |
| WO | 2007061522 | 5/2007 |

OTHER PUBLICATIONS

U.S. Appl. No. 11/800,994, filed May 8, 2007, Spink et al.
U.S. Appl. No. 11/801,952, filed May 11, 2007, Fuglevand et al.
U.S. Appl. No. 11/811,624, filed Jun. 11, 2007, Spink et al.
Chinese Patent Application 200880015047.8; Second Office Action dated Dec. 13, 2012; 8 pages.
EP Patent Application 06816613.1; Extended European Search Report dated Dec. 17, 2012; 8 pages.
U.S. Appl. No. 13/13,457,358, filed Apr. 26, 2012 (not yet published).
U.S. Appl. No. 13/210,265, filed Aug. 15, 2011 (not yet published).
Non-Final Office Action, From U.S. Appl. No. 11/801,952, filed May 11, 2007, Mailed: Sep. 29, 2009.
Response to the Sep. 29, 2009 Non-Final Office Action, From U.S. Appl. No. 11/801,952, filed Feb. 1, 2010.
Final Office Action, From U.S. Appl. No. 11/801,952, Mailed: May 11, 2010.
Non-Final Office Action, From U.S. Appl. No. 11/800,994, filed May 8, 2007, Mailed: Feb. 14, 2011.
Response to the Feb. 14, 2011 Non-Final Office Action, From U.S. Appl. No. 11/800,994, filed May 12, 2011.
Notice of Allowance, From U.S. Appl. No. 11/800,994, Mailed: Aug. 3, 2011.
Restriction Requirement, From U.S. Appl. No. 11/284,173, filed Nov. 21, 2005, Mailed: Jun. 24, 2009.
Response to the Restriction Requirement, From U.S. Appl. No. 11/284,173, filed Jul. 20, 2009.
Non-Final Office Action, From U.S. Appl. No. 11/284,173, Mailed: Sep. 30, 2009.
Response to the Sep. 30, 2009 Non-Final Office Action, From U.S. Appl. No. 11/284,173, filed Feb. 10, 2010.
Final Office Action, From U.S. Appl. No. 11/284,173, Mailed: Apr. 27, 2010.
Response to the Apr. 27, 2010 Non-Final Office Action, From U.S. Appl. No. 11/284,173, filed Jul. 23, 2010.
Advisory Action, From U.S. Appl. No. 11/284,173, Mailed: Aug. 6, 2010.
Supplemental Response to the Apr. 27, 2010 Non-Final Office Action, From U.S. Appl. No. 11/284,173, filed Aug. 11, 2010.
Notice of Allowance, From U.S. Appl. No. 11/284,173, Mailed: Aug. 24, 2010.
Non-Final Office Action, From U.S. Appl. No. 11/978,124, filed Oct. 25, 2007, Mailed: Aug. 16, 2010.
Response to the Aug. 16, 2010 Non-Final Office Action, From U.S. Appl. No. 11/978,124, filed Nov. 15, 2010.
Notice of Allowance, From U.S. Appl. No. 11/978,124, Mailed: Jan. 28, 2011.
Notice of Allowance, From U.S. Appl. No. 11/978,124, Mailed: Jul. 5, 2011.
Non-Final Office Action, From U.S. Appl. No. 13/210,265, filed Aug. 15, 2011, Mailed: Nov. 2, 2011.
Notice of Allowance and Applicant Initiated Interview Summary, from U.S. Appl. No. 13/210,265, Mailed: Mar. 30, 2012.
Non-Final Office Action, From U.S. Appl. No. 13/457,358, filed Apr. 26, 2012, Mailed: Jul. 16, 2012.
Response to the Jul. 16, 2012 Non-Final Office Action, From U.S. Appl. No. 13/457,358, Filed:.
Final Office Action, From U.S. Appl. No. 13/457,358, Mailed: Feb. 25, 2013.
Application Division Office Action, From Chinese Patent Application No. 200880015047.8, Mailed: Jan. 13, 2012.
Response to the Application Division Office Action, From Chinese Patent Application No. 200880015047.8, Filed: May 8, 2012.
First Office Action, From Chinese Patent Application No. 200880015047.8, Mailed: Nov. 5, 2012.
Response to the First Office Action, From Chinese Patent Application No. 200880015047.8, Mailed: May 5, 2013.
Second Office Action, From Chinese Patent Application No. 200880015047.8, Mailed: Sep. 3, 2013.
Response to the Second Office Action, From Chinese Patent Application No. 200880015047.8, Filed: Nov. 17, 2013.
Third Office Action, From Chinese Patent Application No. 200880015047.8, Mailed: Feb. 11, 2014.
Response to the Third Office Action, From Chinese Patent Application No. 200880015047.8, Filed: Apr. 15, 2014.
Extended European Search Report, From EP Application No. 06816613.1, Mailed: Dec. 17, 2012.
Communication Pursuant to Rules 70(2) and 70a(2), From EP Application No. 06816613.1, Mailed: Jan. 13, 2012.
Response to the Communication Pursuant to Rules 70(2) and 70a(2), From EP Application No. 06816613.1, Filed Jul. 16, 2013.
First Office Action mailed Mar. 2, 2015 from China Patent Application No. 201310273456.0, 12 pages.
Response filed Jul. 13, 2015 to the First Office Action mailed Mar. 2, 2015 from China Patent Application No. 201310273456.0, 9 pages.

* cited by examiner

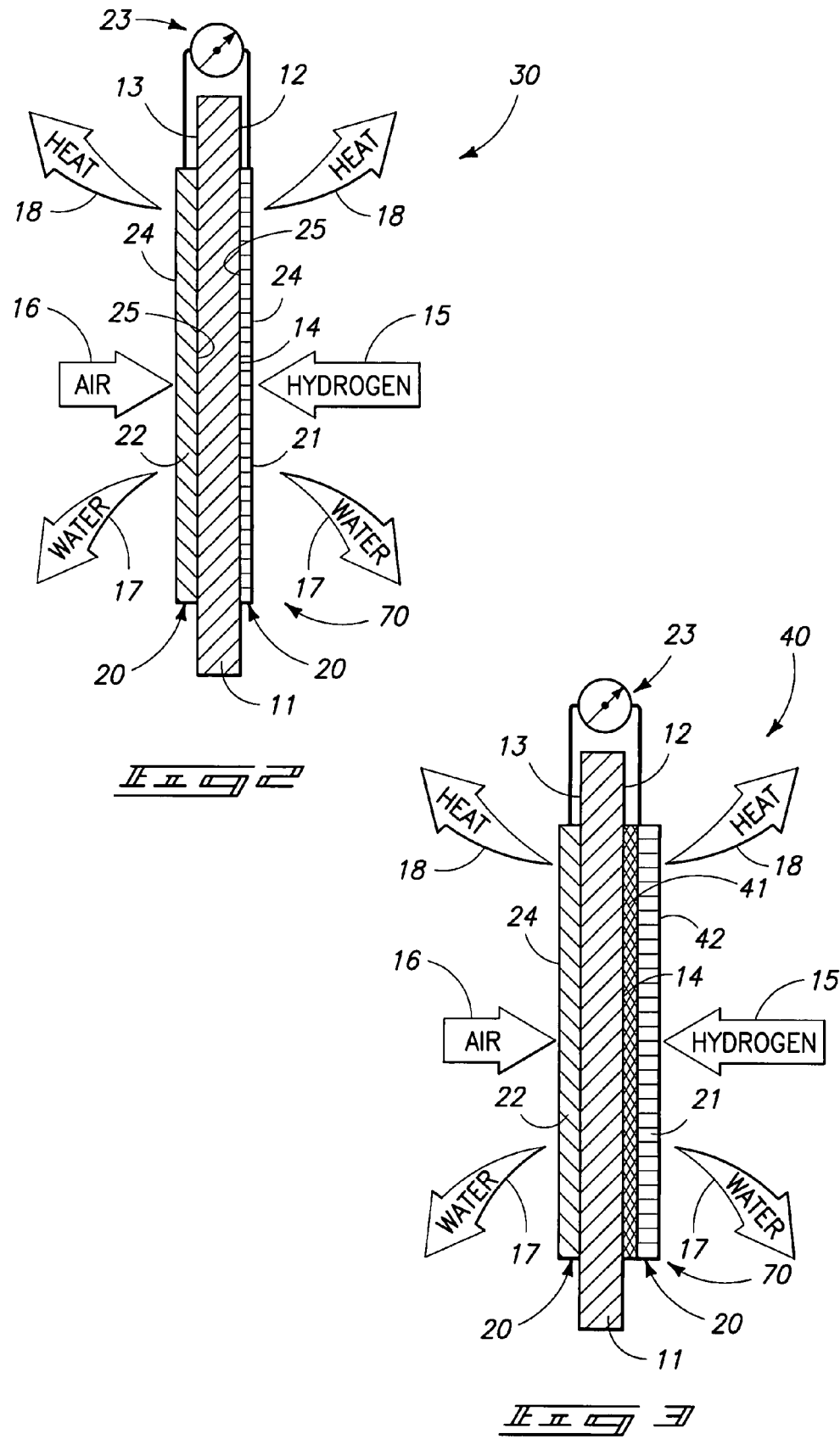

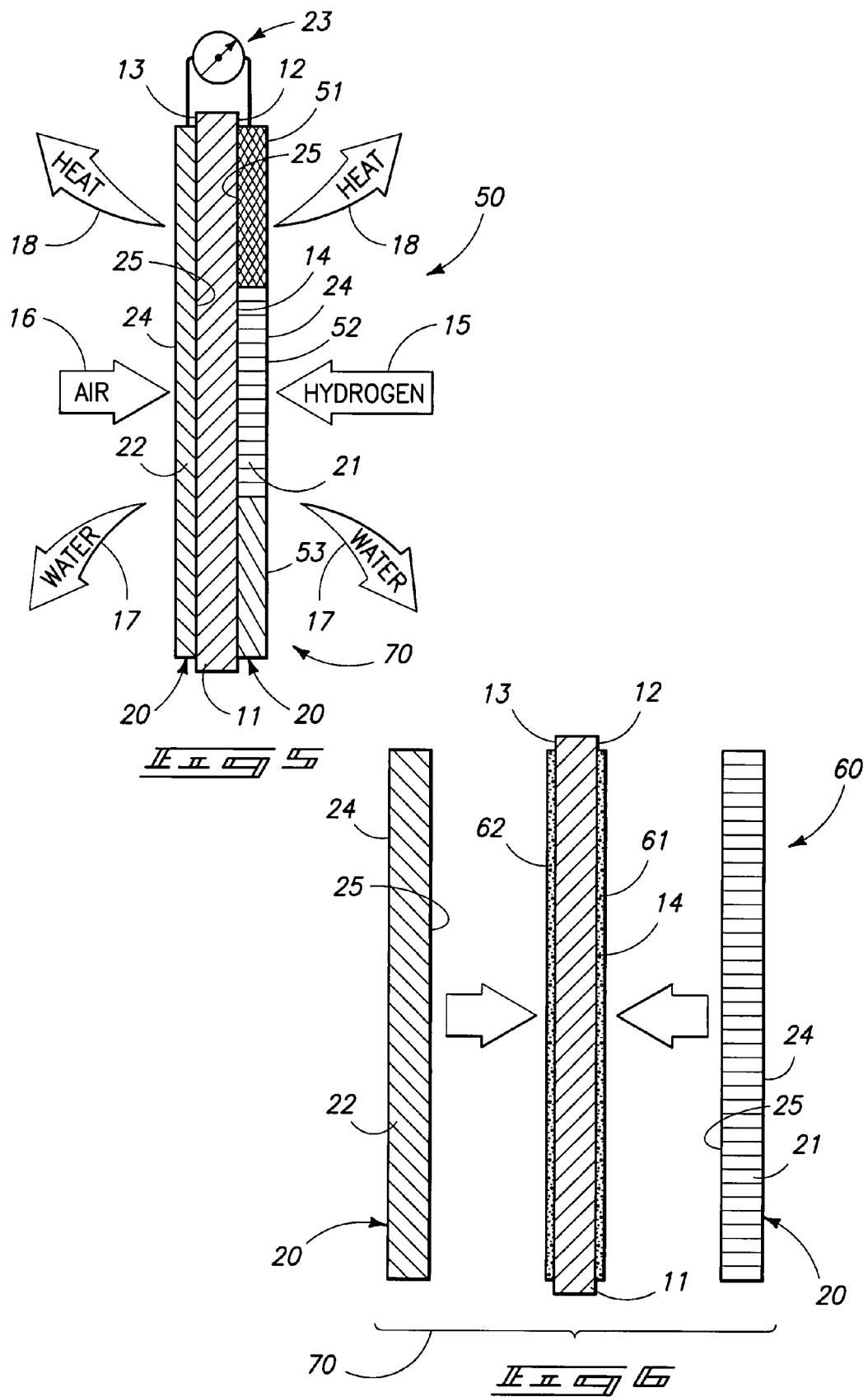

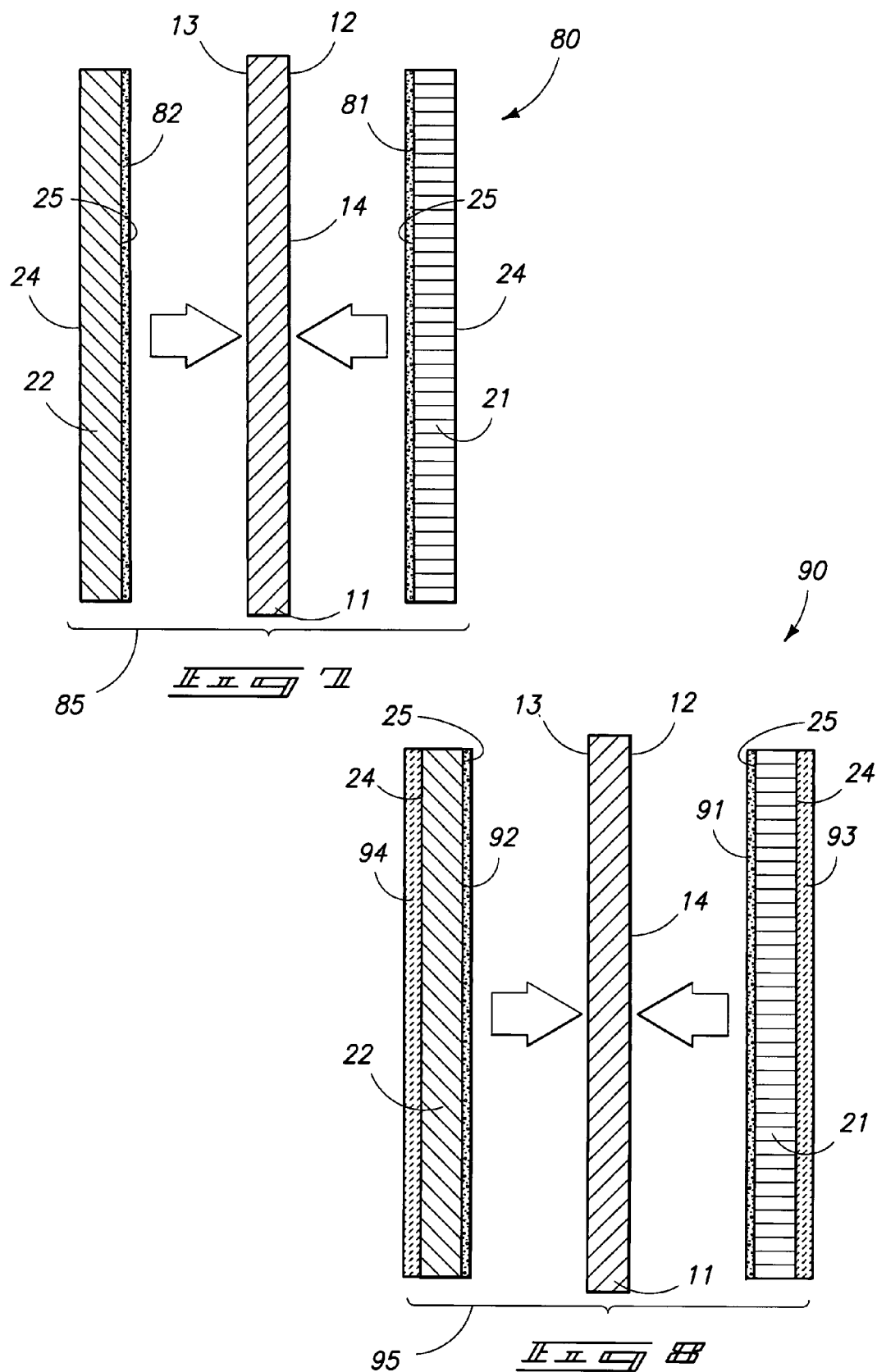

PROTON EXCHANGE MEMBRANE FUEL CELL

TECHNICAL FIELD

The present invention relates to proton exchange membrane fuel cell which includes at least one porous electrically conductive inorganic gas diffusion layer.

BACKGROUND OF THE INVENTION

A fuel cell is an electrochemical device which reacts hydrogen, as a fuel source, and oxygen, which is usually derived from ambient air, to produce electricity, water and heat. The basic process is highly efficient in fuel cells fueled by pure hydrogen, and it is substantially pollution free. Further, since fuel cells can be assembled into various arrangements, power systems have been developed to produce a wide range of electrical power outputs. As a result of these attributes, fuel cell power systems hold a great deal of promise as an environmentally friendly and valuable source of electricity for a great number of applications.

One of a number of known fuel cell technologies is the proton exchange membrane (PEM) fuel cell. The fundamental electrochemical process under which PEM fuel cells operate is well understood in the art. A typical single PEM fuel cell produces a useful voltage of about 0.45 to about 0.70 volts DC, although most fuel cells are operated at about 0.60 volts DC in order to extract the greatest efficiency from same. To achieve a useful voltage, typically a number of individual PEM fuel cells are electrically combined or coupled in series. In one common configuration, a number of individual fuel cells are electrically coupled in series to form a fuel cell stack. In a fuel cell stack configuration, the anode of one fuel cell is electrically coupled to the cathode of another fuel cell in order to connect the two fuel cells in series. Any number of fuel cells can be similarly stacked together to achieve the desired output voltage and current. An example of a fuel cell which achieves the benefits, noted above, of a stack-like arrangement can be found in our U.S. patent application Ser. No. 11/800,994, and which was filed on May 8, 2007, and which is entitled, "Proton Exchange Fuel Cell Stack and Fuel Cell Stack Module." The teachings of this pending application are incorporated by reference herein. In another possible fuel cell arrangement, fuel cell stacks are provided wherein the individual fuel cells are separated by an electrically conductive bipolar separator plate. Further, the individual fuel cells are placed between two end plates, and a substantial compressive force is applied to the individual fuel cells positioned between the end plates in order to effectively seal the structure to prevent leakage of the gas and to achieve an operably effective ohmic electrical connection between the respective fuel cells.

Those skilled in the art have long recognized that fuel cell stacks have limitations inherent in their design. To avoid many of the shortcomings and inherent limitations provided in fuel cell stacks, various proton exchange membrane fuel cell modules have been developed. An example of a proton exchange membrane module that fits this description is found in U.S. patent application Ser. No. 11/284,173 which was filed on Nov. 21, 2005 and which is entitled, "Proton Exchange Membrane Fuel Cell and Method of Forming a Fuel Cell." The teachings of this pending patent application are also incorporated by reference herein. In the proton exchange membrane fuel cells referenced above, each of these devices employ a proton exchange membrane which is typically fabricated from a material called Nafion®. This material has long been the material of choice for proton exchange membrane fuel cells. Nafion® is a copolymer of two monomeric subunits. Those being tetrafluoroethylene (commonly referred to as Teflon®) and perfluoro-3,6-dioxa-4-methyl-7-octene sulfonic acid. Nafion® is extremely resistant to chemical attachment, and the sulfonic acid groups cannot be broken from the Nafion® even by very strong chemical reactions. Those skilled in the art have typically considered Nafion® to a be a super-acid catalyst. In Lewis acid-based terms, this means that Nafion® can very readily accept a free electron. Therefore, a proton exchange membrane formed from Nation® can stimulate certain types of chemical reactions that require removal of an electron in order to initiate the reaction.

A proton exchange membrane fabricated from Nation® is viewed by many who are skilled in the art as having no pH value. As should be understood, pH is the symbol for the degree of acidity or alkalinity of a solution. It is expressed as the negative logarithm of the hydrogen ion concentration in gram equivalents per liter of solution. It should be understood that the concept of pH presumes that the material in question can be dissolved in water or placed in a solution. Nation® does not dissolve in water and therefore does not have a pH value. If Nation® is immersed in water, the water becomes somewhat acidic. However, the increasing acidity the water is not because the Nation® is adding hydrogen ions to the water. Rather, water is comprised of water molecules which include both hydrogen ions and hydroxyl groups. In this situation, the Nation® absorbs the hydroxyl groups and leaves excessive hydrogen ions in the water causing the pH to decrease. Consequently, Nation®, which is typically employed in most proton exchange membrane fuel cells, is considered neither acidic nor alkaline. Further, it has long been known that in order to render Nation® ionically conductive, water must be present in both its liquid and gaseous forms.

In view of this characteristic of this type of proton exchange membrane, fuel cell designers have long recognized that a fine balance must be struck between the generation and retention of water within the proton exchange membrane, and excessive water must be subsequently eliminated so as to maintain the PEM fuel cell fully operational. Additionally, the management of the heat energy generated by prior art fuel cells have presented unique challenges for fuel cell designers. For example, most designs of proton exchange membrane fuel cells have a maximum operationally effective temperature which cannot be exceeded. This maximum operational temperature is the point at which the heat generated by the operation of the fuel cell causes excessive evaporation of water from the proton exchange membrane. The excessive evaporation initiates a hydration spiral which causes the eventual shutdown (and even irreparable damage) of the proton exchange membrane. Therefore, the design of a fuel cell which addresses the myriad of problems of adequate hydration and management of heat during operation of the fuel cell has been uniquely challenging and difficult for one skilled in the art because prior art fuel cells are often deployed in environments where the ambient temperatures and humidities often widely vary over 24-hour time periods. Such is the case when fuel cells are used in desert regions.

As should be understood, prior art proton exchange membrane fuel cells, as described above, have relatively low operating temperatures, that is, less than 200° C., in relative comparison to other designs of fuel cells, such as solid oxide fuel cells (SOFC). A SOFC is a fuel cell which generates electricity directly from a chemical reaction. Yet unlike a proton exchange membrane fuel cell, a SOFC is typically composed of solid ceramic materials. The selection of the materials employed in such a prior art SOFC is dictated, to a large degree, by the high operating temperatures (600-900° C.) which are utilized by such devices. In view of the higher operating temperatures which are needed to render the ceramic electrolyte of a SOFC ionically active, SOFC devices do not require the use of an expensive catalyst (platinum), which is the case with PEM fuel cells as discussed above. Still further, SOFC devices do not need water to be present so as to render them ionically active, as is the case with proton exchange membranes used in PEM fuel cells. As a result of these higher operating temperatures, assorted fuels can be employed with a SOFC which could not be normally used with a PEM fuel cell. Therefore, a SOFC can directly utilize fuels such as methane, propane, butane, fermentation gases and gasified biomasses, to name but a few.

In a typical SOFC device, a ceramic-based electrolyte formed of a material such as zirconium oxide is sandwiched or otherwise located between a porous ceramic electrically conductive cathode layer, and a porous ceramic electrically conductive anode layer. These cathode and anode layers are typically ceramic gas diffusion layers which are selected for their structural rigidity and high temperature tolerance. A SOFC electrolyte must be impervious to air (oxygen), and must be electrically insulating so that the electrons resulting from the oxidation reaction which takes place on the anode side are forced to travel through an external circuit before reaching the cathode side of the SOFC. In a typical SOFC device, a metal electrically conductive interconnect electrically couples the respective fuel cells in a serial arrangement. If a ceramic interconnect is employed, the selected ceramic material must be extremely stable because it is exposed to both the oxidizing and reducing sides of the SOFC at high temperatures. In the operation of an SOFC device, it should be understood that water is generated as a byproduct of the operation of the fuel cell. However, in these fuel cell devices, water cannot, nor need not, be retained by the ceramic hydrophilic gas diffusion layers employed with same in view of the high operating temperatures (600-900°). Still further, while some amount of water is necessary to render a proton exchange membrane operational, no water is necessary to render the ceramic electrolyte used on the SOFC device operational. Rather, the high temperature of operation of SOFC devices renders the electrolyte ionically conductive. Further, these high temperatures of operation have dictated the use of heat-tolerant, porous, ceramic materials, which are hydrophilic, for the anodes and cathodes of same. In contrast, PEM fuel cells have employed hydrophobic gas diffusion layers in combination with the electrodes employed with such devices in order to manage, at least in part, the effective hydration of the PEM fuel cell.

As should be gathered from the discussion above, the cost of fabricating such SOFC devices have been significant. Further, to render such devices operational, rather complex and sophisticated balance of plant arrangements, and control systems must be employed to controllably heat the SOFC device up to an operational temperature, and then maintain the device within acceptable temperature ranges so as to maintain the ceramic electrolyte ionically conductive.

Other attempts have been made in the prior art to fabricate fuel cells which operate at lower temperatures, and which further employ ceramic anodes and cathodes in connection with a fuel cell which achieves many of the benefits discussed above. In this regard, the Office's attention is directed to U.S. Pat. Nos. 3,297,487 and 4,076,899, the teachings of which are incorporated by reference herein. With regard to U.S. Pat. No. 3,297,487, a fuel cell is described which utilizes an acidic electrolyte and wherein at least one of the electrodes consists essentially of a metal/silicon combination which includes metal/silicon alloys and metal disilicides. In the arrangement as seen in that patent, the electrodes formed from the metal/silicon combinations have the desirable properties of being conductive yet resistant to corrosion, and which might be occasioned by acidic electrolytes, such as, for example, mineral acids like sulfuric acid, and which might be employed in that same invention. Still further, that invention disclosed that the metal/silicon materials which are useful in the fabrication of the electrodes for the fuel cell contemplated by that invention are made from silicon and one or more of the metals selected from the group consisting of iron, cobalt, molybdenum, chromium, manganese, vanadium, tungsten and nickel. The fuel cell as disclosed in U.S. Pat. No. 3,297,487, in one form, employs a ion permeable membrane which substantially prevents contact between the oxidant and the fuel. In this U.S. Patent, the fuel cell is described as generating water by the electrochemical reaction as previously discussed; however, the water generated by the electrochemical reaction which takes place in the fuel cell must be removed to avoid dilution of the electrolyte, and this is typically conveniently done at a temperature above 100° C. by having the entire cell attached to a condenser which selectively removes the proper amount of water. Therefore, in an arrangement such as seen in U.S. Pat. No. 3,297,487, water is produced as a byproduct of the fuel cell operation. However, the water is not necessary to render the electrolyte ionically conductive as is the case with the use of solid proton exchange membranes such as those supplied under the Nafion® trademark.

In U.S. Pat. No. 4,076,899, an electrochemical gas electrode is described and which includes a gas-permeable, conductive mass having a thin, gas-permeable hydrophobic film bonded to its gas-contacting surface. The conductive mass consists essentially of, in one form of the invention, 8-75% by weight of silicon and 25-92% by weight of one or more metals selected from the group which includes vanadium, chromium, molybdenum, tungsten, manganese, iron, cobalt and nickel. Still further, the conductive mass may optionally contain a non-essential component of up to 75%, by weight, of a conductive additive which may include a metal, carbon black or graphite. In a fuel cell which incorporates the teachings of U.S. Pat. No. 4,076,899, an electrolyte may be selected which can vary broadly, provided it is inert to the electrodes, and the rest of the fuel cell constituents, and further does not interfere with the fuel or the chemical reactions which takes place within the fuel cell. Acidic aqueous electrolytes are employed and preferred in this prior art invention. One such acidic electrolyte which is preferred is aqueous sulfuric acid because it has a high electrolytic conductivity. Again, in the arrangement as seen in U.S. Pat. No. 4,076,899, water is generated as a byproduct of fuel cell operation. However, the water must be removed from the fuel cell in order to maintain the fuel cell fully operational inasmuch as the water is not required to render the electrolyte ionically conductive and would have the tendency to dilute same.

While traditional proton exchange membrane fuel cell stacks and modules of various designs have operated with some degree of success, a number of shortcomings continue to detract from their usefulness, and have presented quite unique and difficult engineering challenges for prior art fuel cell designers. First among these shortcomings is the relatively high cost of manufacture for the individual components of a traditional proton exchange membrane fuel cell stack. Chief among these high cost components are the bipolar plates which are employed with same. In order to save costs, many manufacturers of fuel cell stacks have attempted to combine a number of functions into the bipolar plates. A modern bipolar plate is a precisely fabricated component that performs a number of functions including fuel management, cooling electrical conductivity, and gas separation. Still further, another problem attendant with the operation of various fuel cell stack designs includes those associated with the management of the proper hydration, and cooling of the fuel cell stack. As noted earlier, some amount of water is necessary to render a proton exchange membrane ionically conductive. However, too much water tends to "flood out" the cell, thereby impairing or stopping the operation of the fuel cell. Still further, while some heat is necessary to achieve an acceptable electrical output, too much heat can cause excessive dehydration which may cause the fuel cell to enter into a hydration spiral where the proton exchange membrane may become breached or otherwise fail to operate effectively. Still further, in proton exchange membrane fuel cell stacks, a heat gradient is typically established throughout the fuel cell stack. Further, "hot spots" may develop, and these hot spots have the effect of degrading the electrical output of the proton exchange membrane fuel cell stack. As should be understood, a number of sophisticated technologies and designs have been developed to manage these hot spots, but the result has been higher manufacturing costs and greater complexity for the resulting fuel cell stack system.

To manage these myriads of problems, sophisticated balance of plant systems have been developed so as to make fuel cells operational in a wider range of ambient environments. However, this has only increased the cost of the resulting fuel cells. The cost of manufacturing, therefore, has been one of several factors which have kept these promising devices from being widely adopted in various industry segments. More specifically, the cost per watt of generated electrical power has far exceeded the cost of electricity taken from most electrical grids. Therefore, fuel cell developers have focused their efforts on reducing the manufacturing costs of the fuel cell by utilizing inexpensive parts and simplified designs so as to lower the price of their products to make them increasingly attractive. Notwithstanding these efforts, the prior art fuel cells have not been widely embraced except in narrow market segments where the costs of manufacture are usually not as important as having a product that can generate electricity for that particular application.

A proton exchange membrane which avoids the shortcomings attendant with the prior art devices and practices utilized heretofore is the subject matter of the present application.

SUMMARY OF THE INVENTION

A first aspect of the present invention relates to a proton exchange membrane fuel cell which includes a proton exchange membrane having at least one gas diffusion layer which is juxtaposed relative thereto, and which is fabricated, at least in part, of a porous, electrically conductive, inorganic material which is selected from the group comprising metal diborides, metal disilicides, metal nitrides, metal carbides, and composites, laminates and solid solutions thereof.

Still another aspect of the present invention relates to a proton exchange membrane fuel cell which includes a proton exchange membrane having opposite anode and cathode sides; and a pair of porous, electrically and thermally conductive ceramic gas diffusion layers individually juxtaposed relative to the anode and cathode sides respectively, and wherein the respective ceramic gas diffusion layers retain an operatively effective amount of liquid water which is generated as a byproduct of the operation of the proton exchange membrane fuel cell so as to render the proton exchange membrane fuel cell substantially self-humidifying.

These and other aspects of the present invention will be described in greater detail hereinafter.

BRIEF DESCRIPTION OF THE DRAWINGS

Preferred embodiments of the invention are described below with reference to the following accompanying drawings.

FIG. 2 is a greatly simplified, enlarged, transverse, vertical sectional view showing a second form of the proton exchange membrane fuel cell of the present invention.

FIG. 3 is another greatly simplified, enlarged transverse, vertical sectional view of another form of a proton exchange membrane fuel cell of the present invention.

FIG. 5 is yet another greatly exaggerated, simplified, transverse, vertical sectional view of another form of the proton exchange membrane fuel cell of the present invention.

FIG. 6 is a greatly enlarged, exploded, transverse, vertical sectional view of another form of a proton exchange membrane fuel cell of the present invention.

FIG. 7 is a greatly enlarged, exploded, transverse, vertical sectional view of another form of a proton exchange membrane fuel cell of the present invention.

FIG. 8 is a greatly enlarged, exploded, transverse, vertical sectional view of yet another form of the proton exchange membrane fuel cell of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
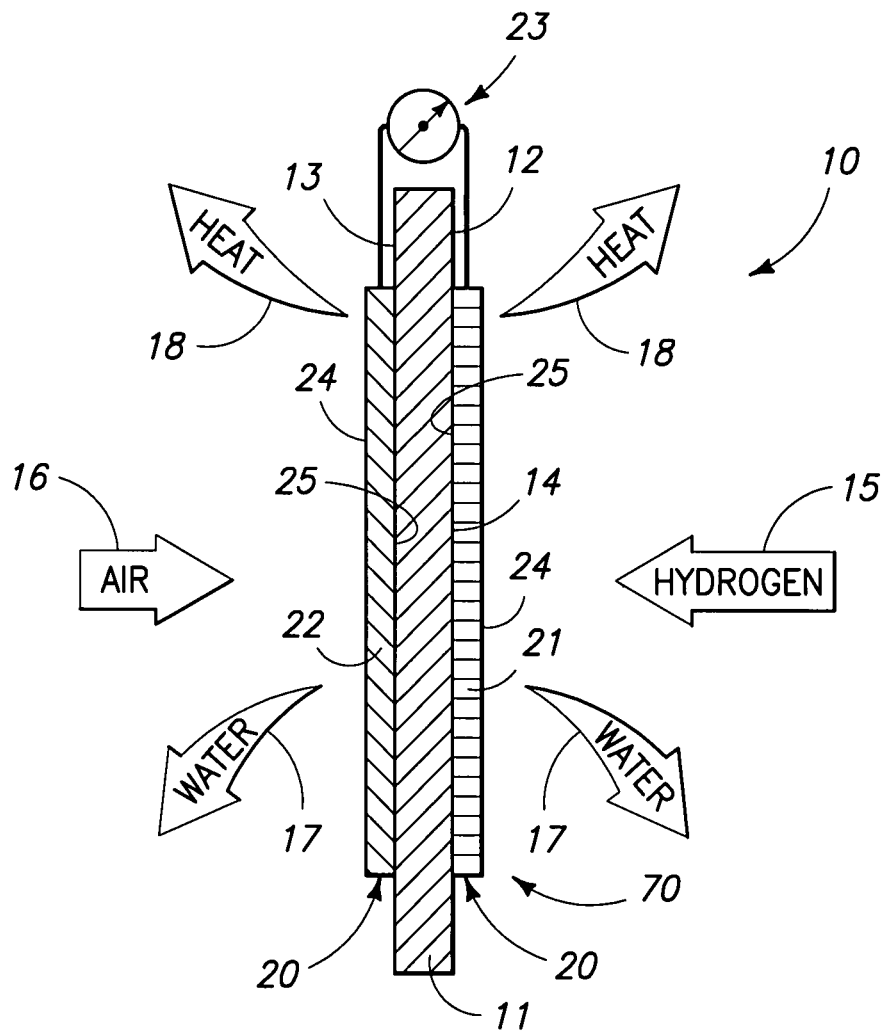
FIG. 1 is a greatly simplified, enlarged, transverse, vertical sectional view of a proton exchange membrane fuel cell of the present invention.

Referring now to FIG. 1, a proton exchange membrane fuel cell of the present invention is generally indicated by the numeral 10 in that greatly simplified, transverse, vertical sectional. As should be understood, the greatly simplified fuel cells, as depicted in their various forms herein, may be employed in assorted arrangements such as in fuel cell stacks, and fuel cell modules, such as disclosed in the various prior art references discussed earlier in this application. As a general matter, and in the first form of the proton exchange membrane fuel cell 10 as seen in FIG. 1, it will be understood that the invention includes a proton exchange membrane 11. A PEM fuel cell typically employs a proton exchange membrane, discussed in detail below, integrated with a catalyst (typically platinum) impregnated within a carbon or carbon-based electrode. This integrated component is referred to as a membrane-electrode assembly, or MEA. In some forms of the present invention, which are discussed in detail later, the catalyst may be deposited or made integral with other structures. This will be discussed in greater detail hereinafter. Therefore, for the purposes of the forms of the invention shown in FIGS. 1-5, the term "proton exchange membrane 11" may refer to a membrane-electrode assembly or a proton exchange membrane wherein the catalyst and electrode layers are provided as seen in the alternative forms of the invention as discussed below, and which are shown in FIGS. 6-8.

The proton exchange membrane 11 in a PEM fuel cell is typically commercially purchased under the Nafion® trademark. Those skilled in the art will recognize that Nafion® does not dissolve in water and therefore does not have a pH value, more specifically, it is substantially neutral. However, it is known that Nafion®, when immersed in water, absorbs hydroxyl groups thereby leaving excessive hydrogen ions in the water. Therefore, as a result, the water does become acidic, but it is not because the Nafion® is adding hydrogen ions to the water but rather because of the absorption of the hydroxyl groups. Those skilled in the art will also recognize that Nafion® is a copolymer of two monomeric units, those being tetrafluoroethylene (Teflon®) and perfluoro-3,6-dioxa-4-methyl-7-octene sulfonic acid. The Teflon® copolymer serves as a backbone with the other monomeric unit attached at regular intervals along the length of the Teflon® backbone. Each of these monomeric units ends in a sulfonic acid group. If this sulfonic acid group were able to be released and dissolved into a solution, it would be a strong acid. However, Nafion® is extremely resistant to chemical attack, and the sulfonic acid cannot be broken from the Nafion® even by very strong chemical reactions. Those skilled in the art will also recognize that some amount of water must be present in the proton exchange membrane fabricated from Nafion® in order to render it ionically conductive. This is in stark contrast to the electrolytes employed in solid oxide fuel cells (SOFC), and wherein the ionic activity of the solid oxide fuel cell electrolytes is achieved by exposing it to high temperature. Further, SOFC's employ electrodes which are fabricated from porous, generally hydrophilic, ceramic materials. These materials are selected so as to be electrically conductive and inert so as to withstand the high operational temperatures of such SOFC's. Moreover, and as in fuel cells arrangements such as seen in U.S. Pat. Nos. 3,297,487 and 4,076,899, which uses highly acidic electrolytes, it will be recognized that water plays no part in either establishing or maintaining the ion conductivity of the electrolyte. Rather, these references teach merely that water which is produced as a byproduct of the operation of these fuel cells must be removed from the fuel cell in order to avoid dilution of the electrolyte and thereby diminishing the effective operation of the respective prior art fuel cells.

Figure 9:
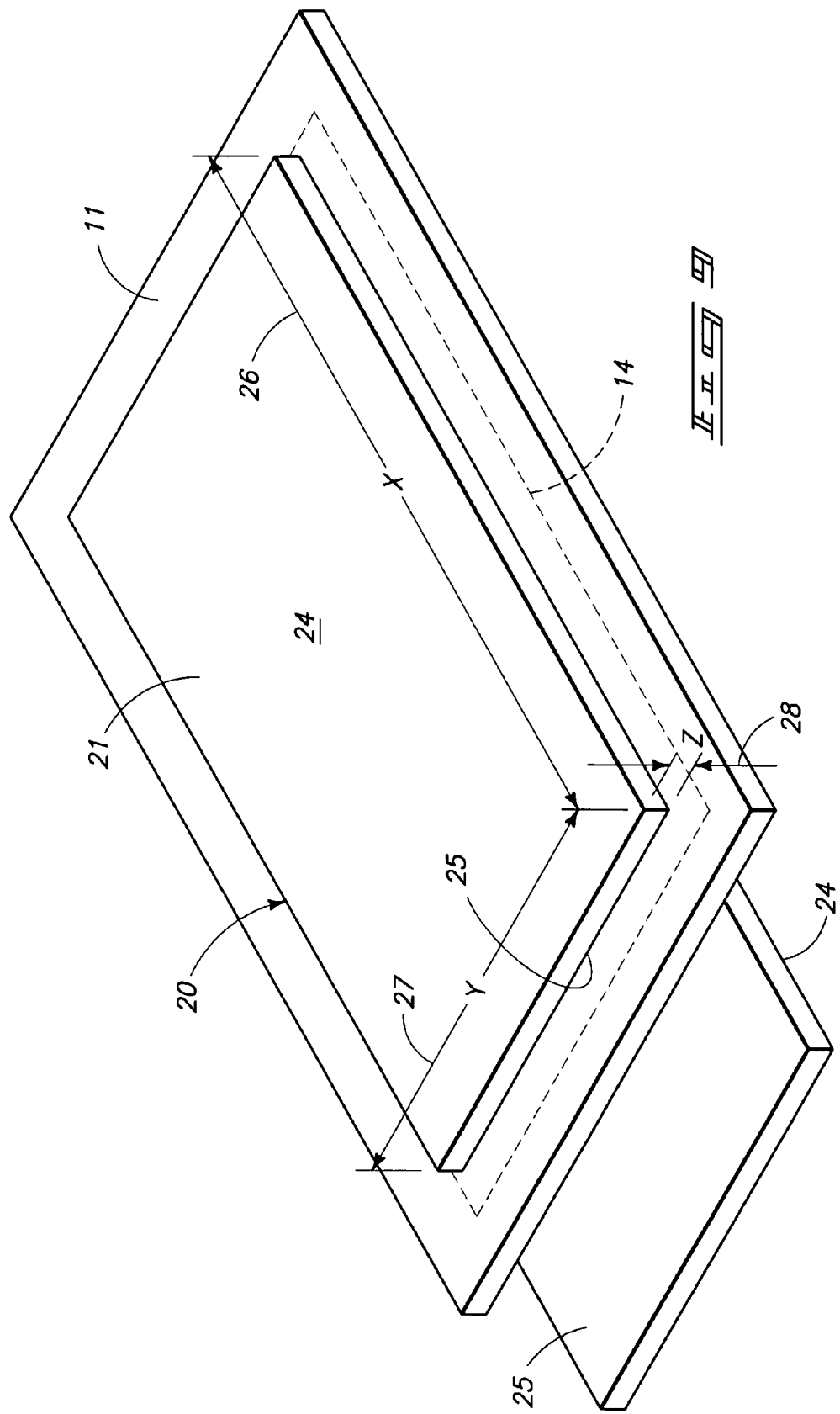
FIG. 9 is a greatly simplified, perspective, exploded view of a proton exchange membrane fuel cell of the present invention.

The proton exchange membrane 11 as seen in FIG. 1 has an anode side 12, and an opposite, cathode side 13. Each of the anode and cathode sides has an active area surface which is generally indicated by the numeral 14. As is well understood in the art, a source of fuel, typically hydrogen 15, is supplied to the anode side 12, and a source of an oxidant, typically air 16, is supplied to the cathode side 13. Fuel cells of this design, during operation, generate water 17, and heat energy 18 as byproducts. As seen in FIG. 1, this first form of the proton exchange membrane fuel cell 10 includes at least one gas diffusion layer 20 which is juxtaposed relative thereto, and which is fabricated, at least in part, of a porous, electrically conductive inorganic material which is selected from the group comprising metal diborides, metal disilicides, metal nitrides, metal carbides, and composites, laminates and solid solutions thereof. In the arrangement as seen in FIG. 1, it should be understood that the porous electrically conductive inorganic material may comprise a porous, electrically and thermally conductive ceramic material which retains an operatively effective amount of liquid and gaseous water 17, and which is generated as a byproduct of the operation of the proton exchange membrane fuel cell 10. This feature of the invention renders the proton exchange membrane fuel cell substantially self-humidifying and the proton exchange membrane 11 ionically conductive. Still further, the gas diffusion layer 20 acts, at least in part, as a thermally conductive transport medium, and further acts, at least in part, as a heat sink, so as to remove heat energy 18 which is generated as a byproduct of the operation of the proton exchange membrane fuel cell 10. As will be appreciated from a study of FIG. 1, the at least one gas diffusion layer 20 comprises a first anode gas diffusion layer which is generally indicated by the numeral 21; and a second cathode gas diffusion layer which is generally indicated by the numeral 22. As will become evident from the discussion which follows with respect to the other forms of the invention, it will be recognized that the porous and electrically conductive gas diffusion layers 21 and 22 may simultaneously act, in some forms of the invention, as a current collector. Further, the respective electrically conductive gas diffusion layers are coupled to an external electrical circuit which is generally indicated by the numeral 23. When employed in a fuel cell stack such as seen in co-pending U.S. patent application Ser. No. 11/800,994, and which was filed on May 8, 2007, the proton exchange membrane fuel cell 10 may be arranged in such a manner so that it is placed into an operational heat transferring orientation relative to another heat sink. This additional heat sink provides a convenient means whereby ambient air may be supplied to the cathode side 13 so as to remove excessive heat energy 18 and water 17, which has been generated during the operation of the proton exchange membrane fuel cell 10. As will be recognized by a study of FIG. 9, the respective first and second porous and electrically conductive gas diffusion layers 21 and 22 each have an outside-facing surface 24, and an opposite inside facing surface 25. The respective first and second porous gas diffusion layers 21 and 22 are each defined by an X axis 26; a Y axis 27; and a Z axis 28.

As noted above, the at least one gas diffusion layer 20 which is employed in the proton exchange membrane fuel cell 10 is fabricated from an inorganic material which is selected from the group comprising metal diborides, metal disilicides, metal nitrides, metal carbides, and composites, laminates and solid solutions thereof. The metal which is selected for this inorganic material is selected from the group comprising titanium, zirconium, vanadium, niobium, tungsten, molybdenum, and tantalum. Still further, the gas diffusion layer 20 that is formed from this inorganic material has a permeability that lies in a range of greater than about 5 Gurley-seconds to less than about 2000 Gurley-seconds. Still further, the proton exchange membrane fuel cell and the porous electrically conductive inorganic gas diffusion layers 21 and 22 are affixed together in order to form an integral or unitary assembly as seen in FIG. 1. The porous and electrically conductive inorganic material forming the at least one gas diffusion layer 20 has a pore size of about 0.5 to about 200 microns. As should be understood, and when fabricated, the porous electrically conductive gas diffusion layers may have a range of pore sizes. More specifically, for any given porous electrically conductive gas diffusion layer, the pore sizes may individually vary by as much as about 500 to 1. Through a mechanism which is not fully understood, it was surprisingly discovered that the generally hydrophilic materials selected for the electrically conductive gas diffusion layer 20 retains a sufficient amount of liquid and/or gaseous water so as to render the proton exchange membrane 11 substantially operationally humidified while simultaneously allowing a sufficient amount of oxidant 16 to reach the cathode side 13 thereof. This novel feature has been achieved without the utilization of known hydrophobic coatings employed in prior art devices heretofore. The unexpected operationally effective hydration of the proton exchange membrane 11 may be due, at least in part, from the hydration of the incoming hydrogen 15 with the byproduct water 17 (in either a liquid or gaseous form), and/or it may be due, at least in part, due to the pores within the porous electrically conductive inorganic gas diffusion layers 21 and 22 holding enough byproduct water 17 which facilitates adequate hydration. Again, the hydration of the proton exchange membrane 11 by means of the porous and hydrophilic inorganic materials forming the at least one gas diffusion layer 20 is a surprising result which is still not fully understood.

As will be appreciated by reviewing FIGS. 1-8, respectively, in one possible form of the invention, it will be understood that the respective electrically conductive and porous ceramic gas diffusion layers 21 and 22 may be fabricated from dissimilar inorganic materials. Still further, in another possible form of the invention, the respective electrically conductive and porous gas diffusion layers 21 and 22 may be fabricated from a similar inorganic material. Still further, in another possible form of the invention, it should be understood that the respective porous, electrically conductive ceramic gas diffusion layers 21 and 22 may have a range of pore sizes which are substantially similar when measured in any one of the X, Y or Z axes 26, 27 and 28, respectively. Moreover, in another possible form of the invention, it should be understood that the range of pore sizes may be dissimilar when measured in any one of the X, Y or Z axes 26, 27 and 28, respectively. The inventors have discovered that by varying the pore sizes, distribution and orientation of these pore sizes in any of the X, Y or Z axes, they have been able to achieve, at least in part, substantially uniform humidification of the proton exchange membrane 11, and further to facilitate, at least in part, the uniform dissipation of heat energy 18, and water 17, which are both generated as byproducts of the operation of the proton exchange membrane fuel cell 10. Therefore, by varying the range of pore sizes, and the type of inorganic material utilized with respect to the anode and cathode gas diffusion layers 21 and 22, a fuel cell designer may optimize the performance of the proton exchange membrane fuel cell 10 in order to facilitate proper operation of the fuel cell (depending upon its configuration, i.e., stack and/or module) and the elimination of hot spots or other conditions which may detract from the effective operation of the proton exchange membrane fuel cell 10. Still further, the employment of such electrically conductive, porous, inorganic gas diffusion layers have, in some fuel cell arrangements, increased the fuel cell ambient operational temperature. This allows fuel cells of this type to be used in higher ambient temperature environments. Therefore, in one possible form of the invention, it will be understood that the respective first and second gas diffusion layers 21 and 22 may have the same thickness dimension as measured in the Z axis 28. However, in other forms of the invention as seen in FIG. 2 and following, the thickness dimension as measured between the respective anode and cathode gas diffusion layers may be different in order to achieve the benefits of the invention as described above (proper heat dissipation, proper humidification, and optimal electrical output).

Referring now to FIG. 2, and in an alternative form of the invention as discussed briefly, above, a proton exchange membrane fuel cell which is generally indicated by the numeral 30 is shown. Similar numbers refer to similar structures with respect to this form of the invention. As will be appreciated from a study of FIG. 2, and as discussed in the paragraph above, the thickness as measured in the Z axis 28 may vary between the anode and cathode gas diffusion layers 21 and 22, respectively. Here, in this form of the invention, the proton exchange membrane fuel cell 30 has a first anode gas diffusion layer 21 which has a thickness dimension as measured in the Z axis 28 which is less than the thickness dimension for the second cathode gas diffusion layer 22.

Referring now to FIG. 3 where similar numbers depict similar structures, a third form of the proton exchange membrane fuel cell is generally indicated by the numeral 40. In this form 40 of the invention, it will be appreciated that the first anode gas diffusion layer 21 comprises a first layer of an inorganic, porous, electrically conductive material 41; and a second layer of a porous, electrically conductive inorganic material 42 overlying same. These different inorganic materials may have different attributes, that is, having a different range of porosities, thicknesses, and electrical conductivities, for example. Still further, the combined thicknesses of the first and second layers 41 and 42 may be the same, or of a different thickness than the second cathode gas diffusion layer 22. In this form of the invention, the first and second layers of inorganic material are provided so as to enhance the operation of the fuel cell, by, on the one hand, encouraging the proper humidification of the proton exchange membrane fuel cell, or further, facilitating the removal of heat energy 18 from the proton exchange membrane fuel cell or both. As should be understood, the inorganic materials selected may be the same, different or having different porosities or densifications based upon the performance requirements of the proton exchange membrane fuel cell 40.

Figure 4:
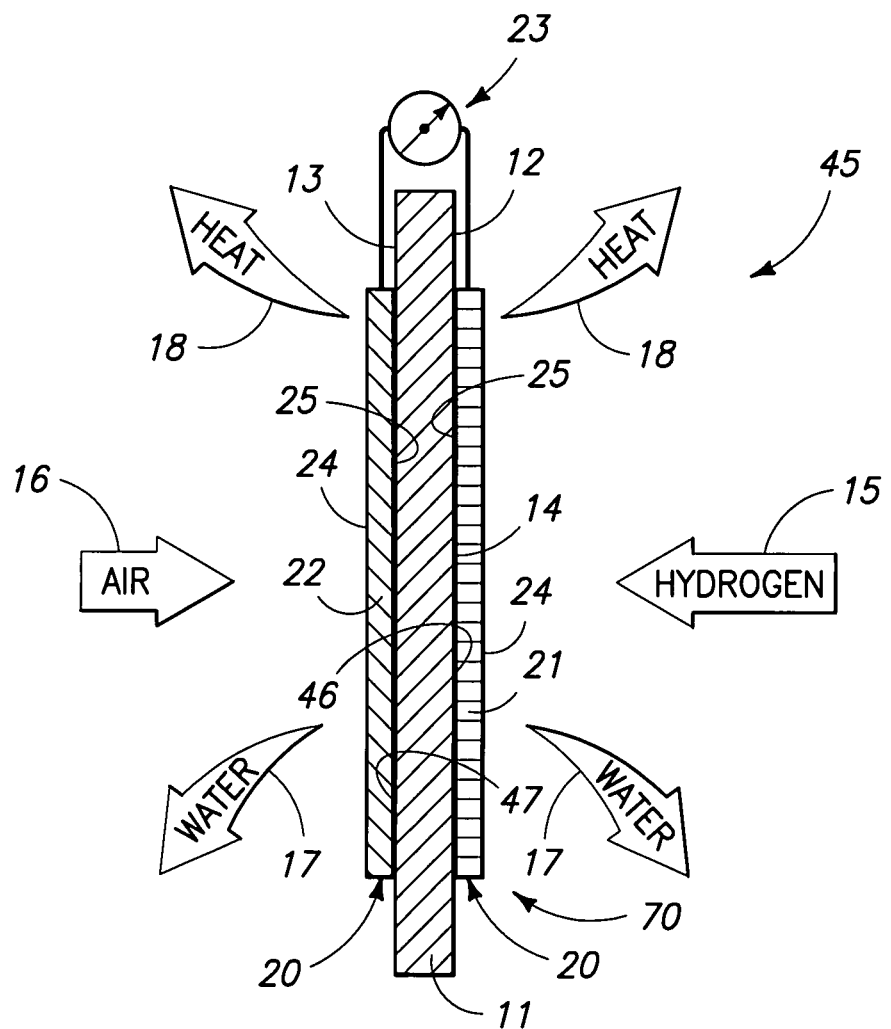
FIG. 4 is yet another greatly exaggerated, simplified, transverse, vertical sectional view of another form of the proton exchange membrane fuel cell of the present invention.

Referring now to FIG. 4, a fourth form of the proton exchange membrane fuel cell is shown and is generally indicated by the numeral 45. Similar numbers depict similar structures as described in earlier forms of the invention described, above. In the fourth form of the invention, a first micro-gas diffusion layer 46 is positioned between the anode inorganic gas diffusion layer 21, and the proton exchange membrane 11, and a second micro-gas diffusion layer 47 is positioned between the cathode inorganic gas diffusion layer 22 and the proton exchange membrane 11. The micro-gas diffusion layers 46 and 47 each have a porosity that differs from the porosity of the porous, electrically conductive inorganic gas diffusion layers 21 and 22. Further, the micro-gas diffusion layers 46 and 47 may also have a hydrophobicity and chemical composition that differs from that of the porous, electrically conductive inorganic gas diffusion layers 21 and 22. It is recognized that one or both of these micro-gas diffusion layers 46 and 47 may be employed in one form of the invention. The micro-gas diffusion layers 46 and 47 typically comprise a nonwoven, carbon-based product, commercially available from Freudenberg Fuel Cell Components Technologies. As seen in FIG. 4, the respective micro-gas diffusion layers 46 and 47 are placed between each of the gas diffusion layers 21 and 22, and the proton exchange membrane 11 to provide a more intimate interface.

Referring now to FIG. 5, a fifth form of the proton exchange membrane fuel cell is shown, and which is generally indicated by the numeral 50. Like numbers depict like structures in this arrangement. As should be appreciated, in the fifth form of the invention, a porous electrically conductive gas diffusion layers 20 may comprise, for example, a first anode gas diffusion layer 21 which is formed into three zones which are generally indicated by the numeral 51, 52 and 53. These specific zones which may or may not be uniform when measured in the X, Y or Z axes 26, 27 or 28, comprise different porous, electrically conductive inorganic materials which are selected so as to facilitate the appropriate operation of the proton exchange membrane fuel cell 50. Again, the respective inorganic materials which are selected for the first, second and third zones 51, 52 and 53 may be of various pore sizes, different materials, varying electrical conductivity, and the like, so as to optimize the operation of the proton exchange membrane fuel cell 50 by facilitating the proper hydration and/or heat dissipation from the proton exchange membrane fuel cell. Therefore, it will be recognized by studying FIGS. 1-5 that the porous electrically conductive inorganic material selected may vary in the ranges of pore sizes, densification, heat dissipation and other physical features so as to achieve the benefits of the present invention.

FIG. 6 is an exploded, transverse, vertical sectional view of another form of the invention, and which is generally indicated by the numeral 60. From a study of FIG. 6, it will be understood that each of the various forms of the invention that are disclosed herein, will typically utilize or have incorporated in their structure, catalytic layers which are generally indicated by the numeral 61 and 62. These catalytic layers are positioned in covering relation relative to the active areas 14 of the proton exchange membrane 11. As discussed above, these catalytic layers may, in some forms of the invention, be provided with or attached to the proton exchange membrane 11 and therefore referred to as a membrane-electrode assembly (MEA). In the form of the invention shown in FIG. 6, the catalytic layers 61 and 62 are positioned on the anode and cathode sides 12 and 13 of the proton exchange membrane 11, respectively. The anode catalytic layer 61 is operable to catalyze the chemical reaction necessary to convert the fuel gas 15 into hydrogen ions which that will then traverse the proton exchange membrane. The cathode catalytic layer 62 is operable to catalyze the chemical reaction necessary to convert oxygen from the air 16 into oxygen ions, which subsequently combine with the hydrogen ions to form the byproducts water 17, and heat 18, which are produced by the operation of the proton exchange membrane fuel cell 60. As seen in FIG. 6, it should be understood that the first and second anode and cathode ceramic gas diffusion layers 21 and 22, which are both porous and electrically conductive, are thereafter pressed and sealably mounted or secured on the proton exchange membrane 11 so as to form a unitary, or integral assembly which is generally indicated by the numeral 70.

Referring now to FIG. 7, another possible form of the invention is illustrated, and which is generally indicated by the numeral 80. As seen therein, like numbers refer to like structures. In the arrangement as illustrated, a form of the invention is shown and wherein first and second catalytically active layers 81 and 82 are borne by the inwardly facing surfaces of the respective first and second porous and electrically conductive inorganic or ceramic material or gas diffusion layers 21 and 22. In the arrangement as seen, the first and second catalytically active layers 81 and 82 are deposited on or integrated with, at least in part, the inwardly facing surfaces of the first and second porous and electrically conductive inorganic and/or ceramic gas diffusion layers 21 and 22 by conventional means, and thereafter the individual first and second porous, electrically conductive ceramic gas diffusion layers 21 and 22 are pressed and otherwise sealed into mating relationship thereagainst the anode and cathode sides 12 and 13 of the proton exchange membrane 11, thereby forming an integral assembly 85.

Another form of the invention 90 is seen in FIG. 8. In this form of the invention 90, first and second catalytically active layers 91 and 92 are deposited on or made integral by conventional means with the inwardly facing surfaces 25 of the first and second porous electrically conductive inorganic ceramic gas diffusion layers 21 and 22, respectively. Still further, first and second porous metalized layers 93 and 94 are deposited individually on the respective first and second electrically conductive porous gas diffusion layers 21 and 22 by conventional means in accordance with the teachings as provided for in U.S. Pat. No. 6,716,549, which is incorporated by reference herein. These porous metalized layers provide an advantageous exterior surface upon which a current collector may make ohmic electrical contact. The first and second porous electrically conductive anode and cathode gas diffusion layers are pressed and sealed into mating relationship thereagainst the anode and cathode sides 12 and 13 for the proton exchange membrane 11 to form a integral assembly as indicated by the numeral 95.

Fuel cells which demonstrate the features and characteristics of the present invention were fabricated and tested. Examples of the fuel cells are discussed below.

EXAMPLE 1

A PEM fuel cell utilizing molybdenum disilicide as the porous, electrically conductive anode and cathode diffusion layers was examined. A test cell was assembled using a 16 square centimeter test fixture developed by the inventors. The cell was assembled using a proton exchange membrane-electrode assembly commercially available from W.L. Gore, and which was sized to fit the text fixture. The molybdenum disilicide gas diffusion layers were fabricated to be slightly undersized, that is, each had a surface area of approximately 11.5 square centimeters. Aluminum foam pieces were used as heat sinks on the anode and cathode sides of the fuel cell, with the cathode heat sink also functioning as a current collector. The molybdenum disilicide gas diffusion layers each had a measured permeability of approximately 1800 Gurley-seconds for the anode gas diffusion layer; and approximately 900 Gurley-seconds for the cathode gas diffusion layer. A nonwoven, carbon-based micro-gas diffusion layer, commercially available from Freudenberg Fuel Cell Components Technologies (Part No. FCX0026), was placed between the gas diffusion layers, and the electrodes of the membrane-electrode assembly, to provide a more intimate interface. The cell was tested under a variety of conditions. The fuel cell was primarily tested at different ambient intake air temperatures under a constant voltage of approximately 600 mV to 650 mV. The peak performance for this cell was typically about 9.5 amperes at 600 mV with an intake ambient air temperature of approximately 47 degrees C. Later, the cathode gas diffusion layer was replaced with a diffusion layer with a measured permeability of approximately 100 Gurley-seconds. The best performance of this cell was about 10.0 amperes with an intake ambient air temperature of approximately 50 degrees C. These performance results indicate that molybdenum disilicide can function well as an electrically conductive gas diffusion layer inside a PEM fuel cell.

EXAMPLE 2

A PEM fuel cell utilizing titanium disilicide as the porous, electrically conductive anode and cathode diffusion layers was examined. A test cell was assembled using a 16 square centimeter test fixture developed the inventors. The cell was assembled using a proton exchange membrane-electrode assembly commercially available from W.L. Gore and which was sized to fit the text fixture. Titanium disilicide was used to fabricate both the anode and cathode gas diffusion layers. Silver-plated folded fin copper was used to fabricate heat sinks which rested in heat transferring relation relative to both the anode and cathode sides of the fuel cell. The cathode titanium disilicide gas diffusion layer had a measured permeability of approximately 170 Gurley-seconds. The anode titanium disilicide gas diffusion layer had a slightly higher permeability, which was measured at approximately 110 Gurley-seconds. A nonwoven, carbon-based micro-gas diffusion layer, commercially available from Freudenberg Fuel Cell Components Technologies (Part No. FCX0026), was placed between the gas diffusion layers, and the electrodes of the membrane-electrode assembly to provide a more intimate interface. The performance of the resulting fuel cell was quite good. It had a peak output current of 10.0 amperes (625 mA per square centimeter), which was reached at an intake ambient air temperature of approximately 44 degrees C. Disassembly of the cell after testing revealed no unusual changes in the titanium disilicide gas diffusion layers. Both the cathode and the anode gas diffusion layers were mostly intact, and there were no signs of corrosion of these components after approximately 72 hours of operation. The inventors believe that the material should have an electrical performance equal to or better than that achieved by the molybdenum disilicide, and should have a superior chemical resistance.

EXAMPLE 3

A PEM fuel cell utilizing titanium nitride as the porous, electrically conductive cathode diffusion layer and titanium diboride as the porous, electrically conductive anode diffusion layer was examined. A test cell was assembled using a 16 square centimeter test fixture developed by the inventors. The fuel cell was assembled using a commercially available proton exchange membrane-electrode assembly which was secured from W.L. Gore. It was sized to fit the text fixture. The titanium nitride and titanium diboride gas diffusion layers were fabricated to be slightly undersized, that is, each with a surface area of approximately 11.5 square centimeters. Aluminum foam pieces were used as heat sinks on the anode and cathode sides of the fuel cell. The cathode heat sink also functioned as a current collector. The titanium nitride cathode gas diffusion layer had a measured permeability of approximately 730 Gurley-seconds. A nonwoven, carbon-based micro-gas diffusion layer, which is commercially available from Freudenberg Fuel Cell Components Technologies (Part No. FCX0026), was placed between the aforementioned gas diffusion layers and the electrodes of the membrane-electrode assembly to provide a more intimate interface. The test cell was primarily operated in a constant current mode with different set points for both output current and air intake temperature. Peak performance was obtained at an intake ambient air temperature of approximately 47 degrees C. with a fuel cell voltage of approximately 630 mV and a total cell output current of 3.8 amperes. The test fuel cell was able to demonstrate significant output current, and an appropriate cell voltage over several days of testing.

EXAMPLE 4

A test PEM fuel cell utilizing zirconium diboride as the porous, electrically conductive anode and cathode diffusion layers was examined. A test fuel cell was assembled using a 16 square centimeter test fixture developed by the inventors. The fuel cell was assembled using a proton exchange membrane-electrode assembly which was commercially secured from W.L. Gore. It was sized to fit the text fixture. Zirconium diboride was used to fabricate both the anode and cathode gas diffusion layers, which were fabricated to be slightly undersized, that is, each had a surface area of approximately 11.25 square centimeters. Silver-plated folded fin copper was used to fabricate heat sinks which were oriented in heat transferring relation relative to both the anode and cathode sides of the fuel cell. The cathode heat sink also functioned as a current collector. The zirconium diboride gas diffusion layers each had a measured permeability ranging from approximately 30 Gurley-seconds to approximately 80 Gurley-seconds within each part. A nonwoven, carbon-based micro-gas diffusion layer, which is commercially available from Freudenberg Fuel Cell Components Technologies (Part No. FCX0026), was placed between the aforementioned gas diffusion layers, and the electrodes of the membrane-electrode assembly to provide a more intimate interface. The test fuel cell was primarily conditioned and produced 7.26 amperes at a constant voltage of approximately 650 mV. This electrical output occurred at an intake ambient air temperature of about 42 degrees C. Upon disassembly of the test fixture, it was observed that the cathode gas diffusion layer showed signs of corrosion in the form of a white powder. The Gurley times of the zirconium diboride gas diffusion layers may be changed as a result of the corrosion. Overall, however, the fuel cell was able to demonstrate significant output current at an appropriate fuel cell operating voltage over several days of testing.

EXAMPLE 5

A test PEM fuel cell utilizing tungsten carbide as the porous, electrically conductive anode and cathode diffusion layers was examined. A test fuel cell was assembled using a 5 square centimeter test fixture developed by the inventors specifically for this test. The test fuel cell was assembled using a proton exchange membrane-electrode assembly which was produced in-house with Nafion® 111 and in-house electrodes. It was sized to fit the text fixture. Tungsten carbide was used to fabricate both the anode and cathode gas diffusion layers, which were each fabricated with a surface area of approximately 5 square centimeters. Silver-plated folded fin copper was used to fabricate heat sinks which were positioned on both the anode and cathode sides of the fuel cell. The cathode heat sink also functioned as a current collector. The cathode tungsten carbide gas diffusion layer had a measured permeability that ranged from 200 Gurley-seconds to 250 Gurley-seconds. The anode tungsten carbide gas diffusion layer had a slightly lower permeability, measured at approximately 390 Gurley-seconds. A nonwoven, carbon-based micro-gas diffusion layer, secured from Freudenberg Fuel Cell Components Technologies (Part No. FCX0026), was placed between the gas diffusion layers, and the electrodes of the membrane-electrode assembly to provide a more intimate interface. The test fuel cell was primarily operated at a constant current output of 1.5 amperes, which corresponds to a current density of 300 mA per square centimeter. After the fuel cell was allowed to condition, the intake ambient air temperature was adjusted to maximize the test cell operating voltage. The test fuel cell reached a peak operating voltage of approximately 600 mV at an ambient air intake temperature of 58 degrees C. Disassembly of the cell after testing revealed no unusual changes in the tungsten carbide gas diffusion layers. Further, there was no detected discoloration or formation of powders on the cathode side. Both anode and cathode gas diffusion layers were intact, with no signs of physical damage. The test fuel cell was able to demonstrate significant output current at an appropriate cell operating voltage over several days of testing.

OPERATION

The operation of the described embodiments of the present invention are believed to be readily apparent, and are briefly summarized at this point.

In its broadest aspect, the present invention relates to a proton exchange membrane fuel cell such as indicated by the numeral 10, and which includes a solid proton exchange membrane 11 having at least one gas diffusion layer 20 which is juxtaposed relative thereto, and which is fabricated, at least in part, of a porous, electrically conductive, inorganic material which is selected from the group comprising metal diborides, metal disilicides, metal nitrides, metal carbides, and composites, laminates and solid solutions thereof. In the arrangement as seen in the drawings, the metal is selected from the group comprising group IV to group VI transition metals. Still further, the transition metal employed in the electrically conductive inorganic material is selected from the group comprising titanium, zirconium, vanadium, niobium, tungsten, molybdenum, and tantalum. As earlier discussed, the proton exchange membrane fuel cell such as 10 generates water 17 and heat 18 as a byproducts during operation. The porous electrically conductive inorganic material forming the gas diffusion layer 20 retains an operationally effective amount of liquid water during operation so as to render the proton exchange membrane fuel cell 10 substantially self-humidifying. In the arrangement as seen in the various drawings, the gas diffusion layer formed from the inorganic material has a permeability that lies in a range of greater than about 5 Gurley-seconds to less than about 2000 Gurley-seconds. Still further, in all of the forms of the invention as shown, a catalyst layer such as indicated by the numeral 61 and 62 is deposited or positioned between the porous electrically conductive inorganic gas diffusion layers 21 and 22 and the proton exchange membrane 11. A micro-gas diffusion layer 46 and/or 47 may further be positioned between the diffusion layers 21 and 22 and the catalyst layers 61 and 62, and which has a porosity that differs from the porosity of the porous electrically conductive inorganic gas diffusion layer. Still further, in another form of the invention, the catalyst layers are deposited, at least in part, on each of the proton exchange membranes and the porous electrically conductive gas diffusion layer 20. Still further, in another form of the invention, the proton exchange membrane 11, and the porous electrically conductive inorganic gas diffusion layers 21 and 22 are affixed to each other 70. In the arrangements as seen in the drawings, the porous electrically conductive inorganic material forming the gas diffusion layers 21 and 22 has a pore size of about 0.5 to about 200 microns. Further in one form of the invention, the porous, electrically conductive inorganic material forming the gas diffusion layers 21 and 22 is selected from the group of inorganic materials consisting essentially of zirconium diboride; zirconium nitride; titanium nitride; titanium diboride; molybdenum disilicide; titanium disilicide; vanadium carbide and tungsten carbide. In the arrangement as seen in the drawings, the proton exchange membrane fuel cell as seen in the various embodiments has an operationally effective ambient operating temperature of greater than about 47 degrees C.

Therefore, a proton exchange membrane fuel cell such as 10 in the present invention includes a proton exchange membrane 11 having opposite anode and cathode sides 12 and 13 and which further includes a pair of porous, electrically and thermally conductive ceramic gas diffusion layers 21 and 22, and which are individually juxtaposed relative to the anode and cathode sides 12 and 13, respectively, and wherein the respective ceramic gas diffusion layers 21 and 22 retain an operatively effective amount of liquid water which is generated as a byproduct of the operation of the proton exchange membrane fuel cell so as to render the proton exchange membrane fuel cell substantially self-humidifying. As seen in the various drawings, and in the various forms of the invention, the porous electrically conductive ceramic gas diffusion layers 21 and 22 each have a pore size of about 0.5 to about 200 microns, and in one form of the invention the respective gas diffusion layers each have a range of pore sizes which are substantially similar. In still another possible form of the invention, the porous electrically conductive ceramic gas diffusion layers 21 and 22 each have a range of pore sizes which are dissimilar. In one possible form of the invention, the porous electrically conductive ceramic gas diffusion layers 21 and 22 each have a similar thickness dimension (FIG. 1), and another possible form of the invention the porous electrically conductive ceramic gas diffusion layers each have dissimilar thickness dimension (FIG. 2). In another possible form of the invention, the respective porous electrically conductive ceramic gas diffusion layers are each fabricated, at least in part, of an inorganic material which is select from the group comprising group IV to group VI transition metal diborides, silicides, nitrides, and carbides, and composites, laminates and solid solutions thereof. In the forms of the invention as shown in the drawing, the porous electrically conductive ceramic gas diffusion layers each have an electrical resistivity of less than about 300 micro-ohm-centimeter. In one possible form of the invention, electrically conductive ceramic gas diffusion layers 21 and 22 are each fabricated from a similar inorganic material. In another form of the invention, the respective electrically conductive ceramic gas diffusion layers are each fabricated from a dissimilar inorganic material (FIG. 5). As seen in the various drawings, the respective porous electrically conductive ceramic gas diffusion layers each have an X, Y and Z axis, and a range of pore sizes, and wherein the range of pore sizes is substantially similar when measured in any one of the X, Y, and/or Z axes. In still another form of the invention, the respective porous electrically conductive ceramic gas diffusion layers 21 and 22 each have an X, Y, and Z axis, and a range of pore sizes, and wherein the range of pore sizes is dissimilar when measured in any one of the X, Y, and/or Z axes.

Therefore, it will be seen that the present invention provides a convenient means whereby the assorted problems associated with operating a proton exchange membrane fuel cell such as managing the water generation and retention as well as dissipating an effective amount of heat energy as a result of the operation of the proton exchange membrane fuel cell may be accomplished in a means not possible heretofore.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A proton exchange membrane fuel cell, comprising:
a copolymer proton exchange membrane having at least one gas diffusion layer which is juxtaposed relative thereto, the at least one gas diffusion layer fabricated solely of a porous, electrically conductive, inorganic material which is selected from the group comprising metal diborides, metal disilicides, metal nitrides, metal carbides, and composites, laminates and solid solutions thereof,
wherein the proton exchange membrane fuel cell is configured to operate with an intake ambient air temperature range of about 42 to about 58 degrees Celsius and generates water as a byproduct during operation, and wherein the porous, electrically conductive, inorganic material forming the at least one gas diffusion layer retains an operationally effective amount of liquid water during operation so as to render the proton exchange membrane fuel cell substantially self-humidifying.

2. A proton exchange membrane fuel cell as claimed in claim 1, and wherein the metal is selected from the group comprising group IV to group VI transition metals.

3. A proton exchange membrane fuel cell as claimed in claim 2, and wherein the transition metal is selected from the group comprising titanium, zirconium, vanadium, niobium, tungsten, molybdenum, and tantalum.

4. A proton exchange membrane fuel cell as claimed in claim 1, and wherein the at least one gas diffusion layer fabricated from the inorganic material has a permeability that lies in a range of greater than about 5 Gurley-seconds to less than about 2000 Gurley-seconds.

5. A proton exchange membrane fuel cell as claimed in claim 1, and further comprising a catalyst layer positioned between the at least one gas diffusion layer and the copolymer proton exchange membrane.

6. A proton exchange membrane fuel cell as claimed in claim 5, and wherein the catalyst layer is deposited on the copolymer proton exchange membrane.

7. A proton exchange membrane fuel cell as claimed in claim 5, and further comprising a micro-gas diffusion layer positioned between the catalyst layer and the at least one gas diffusion layer, and wherein the micro-gas diffusion layer has a porosity that differs from the porosity of the at least one gas diffusion layer.

8. A proton exchange membrane fuel cell as claimed in claim 5, and further comprising a micro-gas diffusion layer positioned between the catalyst layer and the at least one gas diffusion layer, and wherein the micro-gas diffusion layer has a hydrophobicity and/or a chemical composition that differs from the hydrophobicity and/or a chemical composition of the at least one gas diffusion layer.

9. A proton exchange membrane fuel cell as claimed in claim 1, and wherein the copolymer proton exchange membrane and the at least one gas diffusion layer are affixed to each other.

10. A proton exchange membrane fuel cell as claimed in claim 1, and wherein the porous, electrically conductive, inorganic material forming the at least one gas diffusion layer has a pore size of about 0.5 to about 200 microns.

11. A proton exchange membrane fuel cell as claimed in claim 1, and wherein the porous, electrically conductive, inorganic material forming the gas diffusion layer is selected from the group of inorganic materials consisting essentially of zirconium diboride, zirconium nitride, titanium nitride, titanium diboride, molybdenum disilicide, titanium disilicide, vanadium carbide and tungsten carbide.

12. A proton exchange membrane fuel cell as claimed in claim 1, and wherein the copolymer proton exchange membrane has an anode and a cathode side, and wherein individual gas diffusion layers are juxtaposed relative to each of the anode and cathode sides, and wherein the copolymer proton exchange membrane is affixed to each of the individual gas diffusion layers to form a unitary assembly.

13. A proton exchange membrane fuel cell, comprising:
a copolymer proton exchange membrane having at least one gas diffusion layer which is juxtaposed relative thereto, the at least one gas diffusion layer fabricated solely of a porous, electrically conductive, inorganic material which is selected from the group comprising metal diborides, metal disilicides, metal nitrides, metal carbides, and composites, laminates and solid solutions thereof,
wherein the proton exchange membrane fuel cell generates water as a byproduct during operation,
wherein the at least one gas diffusion layer is configured to receive an ambient air intake with a temperature range of about 42 to about 58 degrees Celsius, and
wherein the porous, electrically conductive, inorganic material forming the at least one gas diffusion layer retains an operationally effective amount of liquid water during operation so as to render the proton exchange membrane fuel cell substantially self-humidifying.

14. A system, comprising:
a copolymer proton exchange membrane; and
at least one gas diffusion layer which is fabricated solely of a porous, electrically conductive, inorganic material which is selected from the group comprising metal diborides, metal disilicides, metal nitrides, metal carbides, and composites, laminates and solid solutions thereof,
wherein the at least one gas diffusion layer and the copolymer proton exchange membrane are configured to operate as a proton exchange membrane fuel cell with an intake ambient air temperature range of about 42 to about 58 degrees Celsius.

15. The system as claimed in claim 14, wherein the proton exchange membrane fuel cell is further configured to produce an output current of at least 9.5 amperes at a voltage range of approximately 600 mV to 650 mV within the intake ambient air temperature range.

16. The system as claimed in claim 14, wherein the proton exchange membrane fuel cell is configured to generate water as a byproduct during operation, and wherein the porous, electrically conductive, inorganic material forming the at least one gas diffusion layer retains an operationally effective amount of liquid water during operation so as to render the proton exchange membrane fuel cell substantially self-humidifying.

* * * * *